United States Patent
Sugita

(10) Patent No.: US 7,610,799 B2
(45) Date of Patent: Nov. 3, 2009

(54) ENGINE MEASUREMENT DEVICE

(75) Inventor: Mitsuharu Sugita, Kitamoto (JP)

(73) Assignee: A&D Company, Ltd., Tokyo (JP)

( * ) Notice: Subject to any disclaimer, the term of this patent is extended or adjusted under 35 U.S.C. 154(b) by 168 days.

(21) Appl. No.: 11/920,114

(22) PCT Filed: May 9, 2005

(86) PCT No.: PCT/JP2005/008445

§ 371 (c)(1),
(2), (4) Date: Nov. 8, 2007

(87) PCT Pub. No.: WO2006/120728

PCT Pub. Date: Nov. 16, 2006

(65) Prior Publication Data

US 2009/0100919 A1  Apr. 23, 2009

(51) Int. Cl.
G01M 15/05 (2006.01)
(52) U.S. Cl. ............... 73/114.15; 73/114.25; 73/116.05
(58) Field of Classification Search ............ 73/114.04, 73/114.11, 114.15, 114.25, 116.02, 116.05, 73/118.02
See application file for complete search history.

(56) References Cited

U.S. PATENT DOCUMENTS 5,631,411 A * 5/1997 Harms et al. ............ 73/114.15
6,035,252 A * 3/2000 Dixon et al. .............. 701/102
7,142,974 B2 * 11/2006 Sugita et al. .............. 701/114
2006/0106526 A1 * 5/2006 Sugita et al. .............. 701/114
2008/0276697 A1 * 11/2008 Ostman ................... 73/114.13

FOREIGN PATENT DOCUMENTS

| JP | 8-219952 | 8/1996 |
|----|----------|--------|
| JP | 2002-98617 | 4/2002 |
| JP | 2002-206453 | 7/2002 |
| JP | 2002-267552 | 9/2002 |
| JP | 2003-302313 | 10/2003 |

* cited by examiner

Primary Examiner—Eric S McCall
(74) Attorney, Agent, or Firm—Jordan and Hamburg LLP

(57) ABSTRACT

An engine measurement device includes a detector for measuring individual pieces of time series data containing at least a speed and output torque of an engine in a transient state while the engine is being run in combustion by control of an engine control unit, a torque operation unit for calculating the engine torque on the basis of the time series data of the engine speed and the output torque, and a model operation unit for modeling the engine torque as functions of the engine speed and a fuel injection time. This model is used to calculate both a fuel torque generated by the combustion run of the engine and a mechanical loss torque or the difference between the engine torque and the fuel torque.

17 Claims, 17 Drawing Sheets

ENGINE MEASUREMENT DEVICE

TECHNICAL FIELD

The present invention relates to an engine measurement device for measuring mechanical loss in an automobile engine.

BACKGROUND ART

In order to evaluate whether a developed/manufactured automobile engine is providing the prescribed performance, bench testing has recently been performed by placing the engine to be tested on a platform (engine bench), connecting a dynamometer to the output shaft of the engine via a torque meter and an engine speed meter, and driving the dynamometer to measure/evaluate the performance of the engine unit.

Examples of applications regarding this bench testing system include (1) an "engine bench system (Japanese Laid-open Patent Application No. 2003-207424)" in which an engine-dynamo system is modeled as an inertial system; (2) an "engine bench system (Japanese Laid-open Patent Application No. 2003-207422)" in which a mechanical parameters of the inertial system of an engine-dynamo control system is used to model a control system; (3) an "automobile engine testing device (Japanese Patent No. 3489241)" in which an actuator is linked to the throttle valve of an engine via a wire, and a model is created for a control object from an actuator position command up until an estimated torque is obtained; and other examples.

Measurement of the mechanical loss of an engine in an evaluation of the performance of the engine is desired both for enhancing fuel consumption and for performing highly precise ECU control.

The term "mechanical loss" refers to the difference between the fuel torque (input) that is generated by combustion driving of the engine, and the engine torque (output) that is the force that actually drives the engine, and is a generic term for frictional loss between the cylinders and the pistons and piston rings, frictional loss from the crankshaft, camshaft, and other bearings, frictional loss between cams and cam followers, drive loss and other frictional loss in the alternator, pumps, distributor, and other auxiliary machinery, engine pump loss (pumping loss) and thermal loss that cannot be separated for measurement, and other torques that do not contribute to combustion driving of the engine.

The mechanical loss of an engine has therefore been measured in the past using the system described in Patent Document 1. In the mechanical loss torque measurement system described in Patent Document 1, an engine 20 is connected to a motor 30 (dynamometer), and the torque of the motor 30 is measured multiple times under the same conditions (at a constant engine speed and engine oil temperature) without inducing combustion in the engine. Testing according to a method in which the torque is measured with the engine speed and other conditions held constant (steady state) is generally referred to as steady-state testing.

Patent Documents 2 and 3 also disclose devices for calculating mechanical loss or engine torque through steady-state testing.

However, such measurement systems have the technical drawbacks described below.

Patent Document 1: Japanese Laid-open Patent Application No. 2002-267552

Patent Document 2: Japanese Laid-open Patent Application No. 2002-206453

Patent Document 3: Japanese Patent No. 3489241

In the measurement systems disclosed in Patent Documents 1 through 3, measurement must be performed in a steady state in which the engine speed and other conditions are constant.

Not only in engine speed, but in almost all physical phenomena, the steady state is generally achieved after a transient state (a state in which values cannot stabilize at a constant level, and cycle with a certain amplitude), and a time of several tens of seconds is required for the engine speed to settle into a steady state even in the case of engine torque measurement.

Consequently, a period of several days is required to obtain all the torque data for each engine speed/throttle travel that are necessary to evaluate the engine performance. Furthermore, the items evaluated for engine performance are not limited to engine torque or mechanical loss, and several hundred aspects are tested. A method is therefore needed for speeding the acquisition of even one of these items of measurement data.

The present invention was developed in view of such drawbacks as the foregoing, and an object of the present invention is to provide an engine measurement device for calculating the mechanical loss of an engine in a short time during the period of the transient state that occurs before the items of data stabilize into a steady state, without using the conventional steady-state testing method.

The technological background that makes the present invention possible includes significant progress in semiconductor devices used for digital processing that enable multi-channel measurement data to be acquired at high speed and high resolution and stored as time-axis synchronized signals, and that enable removal of high-frequency components by a low-pass filter, time-axis compensation/inverse transfer function compensation of measurement time delays between channels, and other processing; and the application of these semiconductor devices in transient measurement.

MEANS USED TO SOLVE THE ABOVE-MENTIONED PROBLEMS

The engine measurement device of the present invention for achieving the abovementioned objects is an engine measurement device for measuring engine performance by bench testing that is performed by an automobile engine and a load connected to the engine, wherein the engine measurement device is configured so that the engine measurement device comprises an engine control unit for controlling a fuel injection timing of the engine; a detector for measuring time series data that include at least a speed of the engine and an axial torque detected between the engine and a load in a transient state, in a state in which the engine is combustion-driven by the control of the engine control unit; a torque computation unit for computing an engine torque that is the actual drive force of the engine on the basis of the time series data of the engine speed and axial torque; and a model computation unit for modeling the engine torque using the engine speed, the fuel injection timing, and other engine parameters; wherein a fuel torque generated by the combustion driving of the engine, and a mechanical loss torque that is the difference between the engine torque and the fuel torque are calculated from the model.

Such a configuration makes it possible to calculate the mechanical loss of the engine in a short time during the period of the transient state before the measurement data stabilizes into a steady state, without the use of the conventional steady-state testing method.

In the past, since testing to calculate the mechanical loss torque was performed without combustion-driving of the engine, it was impossible to measure the fuel torque as an input factor, and the mechanical loss that was calculated during combustion driving of the engine had insufficient accuracy. However, according to the present invention, the engine torque during combustion driving of the engine is computed as a separate fuel torque and a mechanical loss torque, and the engine torque can also be computed in a short time using transient data. The engine torque can therefore be useful for enhancing the accuracy of ECU control for enhancing fuel consumption, and for other aspects of engine control.

In an engine measurement device for measuring engine performance by bench testing that is performed by an automobile engine and an external driving means connected to the engine, the engine measurement device is configured so that the engine measurement device comprises an engine control unit for controlling the throttle travel of the engine; an external driving means control unit for controlling the external driving means; a detector for measuring time series data that include at least a speed of the engine and an axial torque detected between the engine and the external driving means in a transient state, in a non-combustion drive state in which the external driving means is driven by the control of the engine control unit and the external driving means control unit; a torque computation unit for computing an engine torque that is the actual drive force of the engine as a mechanical loss torque that occurs during the non-combustion driving, on the basis of the time series data of the engine speed and axial torque; and a model computation unit for modeling the mechanical loss torque using the engine speed, an engine oil temperature, an intake air quantity, and other engine parameters; wherein the mechanical loss torque is computed from the model for each of the engine parameters.

Such a configuration makes it possible to calculate the mechanical loss of the engine in a short time during the period of the transient state before the measurement data stabilizes into a steady state, without the use of the conventional steady-state testing method.

Since the mechanical loss torque can be computed separately for each engine parameter, the engine parameter that is taken into account during modeling of the mechanical loss can be arbitrarily selected in accordance with the purpose of the testing/evaluation, and the flexibility of the testing/evaluation is improved.

The model may be a function of the engine parameters.

The mechanical loss torque of each engine parameter can easily be computed by functional modeling.

The engine measurement device may also be provided with a display unit for displaying the computed engine torque, mechanical loss torque, fuel torque, and any two or more of the engine parameters.

According to such a configuration, the torques or engine parameter functions can be visually assessed at a glance, thereby contributing to rapid evaluation of engine performance, and enhanced accuracy of ECU control.

The torque computation unit may also compute the engine torque by performing computational processing that includes time differentiation of the time series data of the engine speed.

According to such a configuration, the engine torque is computed from transient data, and the computation time is therefore significantly reduced in comparison with the conventional engine measurement device in which the engine torque was computed after waiting for the engine speed to stabilize into a steady state.

The torque computation unit may comprise a filter processing unit for removing the effects of a moment of inertia that is included in the time series data, wherein the filter processing unit performs frequency analysis of the time series data to separate the time series data into a low-frequency component and a high-frequency component, and removes the high-frequency component using a low-pass filter.

When the high-frequency component that is superposed on the transient data used in the present invention is merely averaged, the high-frequency component is cancelled out to zero, the data are altered from the data that were to be used in the original evaluation, and a proper evaluation can no longer be performed. A method for separating the transient data into low frequencies and high frequencies and removing unnecessary components is therefore an essential technique for analysis and processing of transient data.

The model computation unit may determine constants $Kf_1$, $Kf_2$, $Km_1$, and $Km_2$ so as to conform to the function:

$$\text{Engine torque } T_e=(Kf_1\times(FT)^2+Kf_2\times(FT))+(Km_1\times(N)+Km_2)$$

wherein the engine speed N and the fuel injection timing FT are engine parameters.

The model computation unit according to the first aspect may thus model the engine torque using a function.

The following function may also be used: Mechanical loss torque $T_m=-(Km_1\times(N)+Km_2)$.

As previously mentioned, by modeling the engine torque as a function of the engine speed and the fuel injection timing, the factor that depends on the engine speed can be considered as the mechanical loss torque.

The model computation unit may indicate the engine speed N as an engine parameter, and indicates a mechanical loss torque $T_{mm}$ as a primary approximation or secondary approximation of the engine speed N.

The model computation unit according to the second aspect thus models the engine torque as a function of the engine speed, and the function model can thereby be directly considered as the mechanical loss torque.

The model of the mechanical loss torque $T_m$ computed by the engine measurement device according to the first aspect may be compared with the model of the mechanical loss torque $T_{mm}$ computed by the engine measurement device according to the second aspect to verify the validity and consistency of the mechanical loss torques.

Specifically, the mechanical loss torque $T_m$ and the mechanical loss torque $T_{mm}$ may each be modeled as primary approximations of the engine speed N, and the validity and consistency of the mechanical loss torques may be verified by comparing the engine speed N coefficients with each other.

The mechanical loss torques $T_m$ and $T_{mm}$ differ from each other according to the testing conditions as to whether combustion is induced in the engine, but the validity and consistency of the mechanical loss torques $T_m$ and $T_{mm}$ can be verified through comparison of the mechanical loss torques with each other. Since $T_m$ and $T_{mm}$ can be treated as data in the same dimension, different mechanical loss data resulting from different tests can be appropriately combined and used for engine analysis.

The mechanical loss torque due to combustion in the engine may be computed by subtracting the mechanical loss torque $T_{mm}$ from the mechanical loss torque $T_m$.

Since a mechanical loss torque due to combustion, as well as a mechanical loss torque due to machine components, and all other types of mechanical loss are included in the mechanical loss torque $T_m$, a consistent mechanical loss torque $T_m$ and mechanical loss torque $T_{mm}$ can be used to extract only the mechanical loss torque that is caused by combustion, which could not be measured in the past.

EFFECT OF THE INVENTION

The engine measurement device of the present invention makes it possible to calculate the mechanical loss of an engine in a short time during the period of the transient state that occurs before the items of measurement data stabilize into a steady state, without using the conventional steady-state testing method.

In the past, since testing to calculate the mechanical loss torque was performed without combustion-driving of the engine, it was impossible to measure the fuel torque as an input factor, and the mechanical loss that was calculated during combustion driving of the engine had insufficient accuracy. However, according to the present invention, the engine torque during combustion driving of the engine is computed as a separate fuel torque and a mechanical loss torque, and the engine torque can also be computed in a short time using transient data. The engine torque can therefore be useful for enhancing the accuracy of ECU control for enhancing fuel consumption, and for other aspects of engine control.

When the mechanical loss is calculated during non-combustion driving, since the mechanical loss torque can be computed separately for each engine parameter, the engine parameter that is taken into account during modeling of the mechanical loss can be arbitrarily selected in accordance with the purpose of the testing/evaluation, and the flexibility of the testing/evaluation is improved.

BEST MODE FOR CARRYING OUT THE INVENTION

Preferred embodiments of the present invention will be described in detail hereinafter based on the accompanying drawings. FIG. 1 is a diagram showing the general connection configuration of the engine measurement device 1 of the present example, wherein the engine measurement device 1 is provided with an automobile engine 10 as the testing subject, a dynamometer 12 that is connected to the engine 10, and a stand (engine bench) 14 for fixing the engine 10 and the dynamometer 12.

Methods of testing that use the engine measurement device 1 include firing testing for measuring engine performance in a state in which fuel is fed to the engine 10 to cause combustion driving in the engine 10, and motoring testing in which engine performance is measured in a non-combustion driving state of the engine 10 without feeding/combusting fuel, i.e., a state in which the dynamometer 12 is driven. However, a case will be described in the present example in which the engine measurement device 1 is first used in firing testing.

The engine measurement device 1 is used in bench testing for simple measurement/evaluation of the performance of the engine 10 without connecting actual components (transmission, tires, and the like) other than the engine 10.

In the present example, one end of a torque transmission shaft 16 is connected to the output shaft of the engine 10 via a universal joint 16a or other connecting member, an engine speed detector (tachymeter), a torque meter, or other type of detector 2 is connected to the other end of the torque transmission shaft 16, and a dynamometer 12 is connected via the detector 2.

A low-inertia dynamometer is used as the dynamometer 12 of the present example so as to enable a stable output to be obtained from the detector 2 according to each engine speed even when a sudden change in engine speed occurs from low-speed rotation of the engine 10 to high-speed rotation at maximum output.

In the present example, the torque is detected in the detector 2 that is placed between the torque transmission shaft 16 and the dynamometer 12, but it is also possible to detect the torque from the output of the dynamometer 12. Besides the detector 2, a clutch, a transmission, and various types of linkages and the like may also be inserted into the torque transmission shaft 16 according to the purpose of the bench testing.

Since the dynamometer 12 used in the present example is a low-inertia dynamometer, and the load torque detected by the dynamometer 12 and the axial torque $T_d$ detected by the detector 2 are essentially the same, the load torque and the axial torque $T_d$ mentioned hereinafter are synonymous. In the present specification, the load torque detected by the dynamometer 12 is included in the axial torque $T_d$ that is detected between the engine 10 and the dynamometer 12.

Furthermore, the engine measurement device 1 is provided with an engine control unit 3, a central control unit 5, a signal processing unit 6, and a display unit 7.

The engine control unit 3 is connected to the engine 10, and is a means of controlling the throttle travel S and the fuel injection timing FT of the engine 10 during the firing testing of the present example. The engine control unit 3 may also be included within the engine ECU.

In the case of firing testing, the engine control unit 3 provides a prescribed fuel injection timing FT to the engine 10, whereby the engine 10 performs combustion, the force of the exploding fuel in an internal cylinder is received by a piston, and the vertical movement of the piston is transmitted to the dynamometer 12 via the torque transmission shaft 16 and converted to rotational movement of the dynamometer 12. In other words, the engine speed N of the engine 10 is obtained through the control of the fuel injection timing FT by the engine control unit 3. The engine speed N can be detected by the detector 2, as well as by a tachymeter (not shown) that is mounted to the engine 10 or the dynamometer 12. The dynamometer 12 supplies the load during the firing testing of the present example.

The central control unit 5 is a means of controlling the engine control unit 3, the signal processing unit 6 described hereinafter, and the display unit 7. The central control unit 5 may operate based on an instruction from an operation input unit not shown in the drawing, for example. The central control unit 5 and the engine control unit 3 may also be an ECU.

The central control unit 5 of the present example controls the engine control unit 3 in the control process of the engine 10 so that at least two types of time series data that include time series data of the engine speed N in the non-constant transient state, and the axial torque $T_d$ that varies during the period of the transient state are measured from the detector 2.

The signal processing unit 6 is provided with a measurement unit 60, memory 62, a torque computation unit 64, and a model computation unit 66, and operates based on the instruction of the central control unit 5, as shown in detail in FIG. 1. A control unit for controlling the signal processing unit 6 or the display unit 7 may be provided separately from the central control unit 5 that controls the engine control unit 3.

The measurement unit 60 is a means for measuring and inputting the measurement data that are obtained from the detector 2 while the engine control unit 3 is controlled by the central control unit 5, and testing is performed under predetermined testing conditions, i.e., the time series data of the engine speed N and the axial torque $T_d$, and the time series data of the fuel injection timing FT and the throttle travel S that are presented from the engine control unit 3 to the engine 10 during the same period.

The time series data of the throttle travel S and the fuel injection timing FT may be directly inputted from the central control unit 5, rather than from the engine control unit 3, and may also be inputted from a throttle travel detector, a fuel injection timing counter, or another detector that is provided to the engine 10. Besides the abovementioned time series data, time series data of the fuel oil temperature or the intake air quantity may also be inputted to the measurement unit 60 according to the subject of the evaluation.

When the measurement data are made up of analog signals, the measurement unit 60 is provided with an A/D converter to convert the analog signals to digital signals. When the measurement data are made up of digital signals, an A/D converter is unnecessary, but the plurality of units of inputted measurement data must in any case be time-synchronized with each other for processing by the torque computation unit 64.

The memory 62 is a means for temporarily storing the measurement data inputted to the measurement unit 60, and the data computed by the torque computation unit 64 and the model computation unit 66 described hereinafter.

The torque computation unit 64 is a means for calculating the engine torque $T_e$ from the transient-state time series data of the measured engine speed N and axial torque $T_d$.

The relationship $T_e = T_d - I \times dN/dt$ (wherein I is the inertial moment of the rotational axis that includes the engine 10, the transmission system from the engine 10 to the dynamometer 12, and the dynamometer 12) exists between the axial torque $T_d$ that was measured in the past and the engine torque $T_e$ that contributes to the actual engine driving, and this relationship essentially indicates the simple engine unit performance. In other words, a flywheel and other inertial components of the torque transmission system are included in the axial torque $T_d$ and could not be used to evaluate the true engine performance.

Therefore, the engine torque $T_e$ was calculated in the past by measuring the axial torque $T_d$ in the steady state (state in which the differential term of the engine speed N is zero) during bench testing using the dynamometer 12. However, as described above, time is required for the steady state to be attained, and in order to shorten the measurement time, the present invention is characterized in that the engine torque $T_e$ that is used to evaluate the true engine performance is computed by acquiring the transient data of the axial torque $T_d$ and the engine speed N.

Specifically, corrected data ($= I \times dN/dt$) of the engine torque $T_e$ are calculated based on the time series data of the measured engine speed N, the axial torque $T_d$ and the corrected data thereof are subtracted at regular time intervals of the time series data, and the engine torque $T_e$ ($= T_d - I \times dN/dt$) is calculated.

The value used for the inertial moment I is already known when the inertia is known in advance, but this value must be estimated when the inertia is unknown. The inertia is estimated by a method in which the engine or the dynamometer is driven in a state in which the engine is connected to the dynamometer, the engine speed N is varied from minimum to maximum to minimum, the torque T is measured, and a model in which the torque $T = (I \times dN/dt + a \text{ constant})$ is created with the engine speed N near maximum, whereby I is estimated. The effects of temperature are preferably taken into account during the estimation. In the example described hereinafter, the value $I = 0.17 \text{ kgm}^2$ obtained by estimation is used for firing testing as well as for motoring testing.

In the engine measurement device 1 of the present invention thus configured, the measurement data (transient data) in the non-constant transient state are used without waiting for the engine speed N to stabilize to a steady state, the time differential of the engine speed N is computed, and the inertial moment I is multiplied by this time differential to obtain the corrected data, and the corrected data are subtracted from the axial torque $T_d$ at regular time intervals to compute the engine torque $T_e$. The time needed to compute the engine torque $T_e$ is therefore significantly reduced in comparison to the conventional technique.

The model computation unit 66 is a means for modeling the time series data of the computed engine torque $T_e$ using the engine speed N, the fuel injection timing FT, and other engine parameters. Prior to modeling, first data correction processing is preferably performed for performing time axis alignment and the like of data that accompanies a time delay that occurs due to filtering (noise removal), signal level alignment, and measurement.

Modeling will be described in detail hereinafter. Specific examples of modeling include mathematization (functional modeling), as well as graphic representation, block diagramming, and the like, but an example of mathematical modeling will be described herein.

In the case of firing testing, the model computation unit 66 performs computational processing whereby the engine torque $T_e$ is modeled into a function of the engine speed N and the fuel injection timing FT indicated by the equation below on the basis of the time series data of the engine speed N and fuel injection timing FT obtained from the measurement unit 60, and the time series data (both of which have undergone the first data correction processing) of the engine torque $T_e$ that was previously obtained by the torque computation unit 64.

$$T_e = (Kf_1 \times (FT)^2 + Kf_2 \times (FT)) + (Km_1 \times (N) + Km_2) \text{ (wherein } Kf_1, Kf_2, Km_1, \text{ and } Km_2 \text{ are constants)} \quad (1)$$

In theory, the mechanical loss torque $T_m$ computed during firing testing is the difference between the engine torque $T_e$ (output) and the fuel torque $T_f$ (input), and the mechanical loss torque $T_m$ can be generally broken down into loss due to combustion and loss that is simply due to mechanical components (mainly due to friction).

Specifically, the term "loss due to combustion" refers to loss that can only be computed during firing testing, such as air intake loss (gas exchange loss, blowdown (exhaust effusion) loss, pump loss (exhaust, intake loss), frictional loss in the air intake system, and valve throttling loss), loss due to incomplete combustion (caused by the air mixture composition, air-fuel consumption, the EGR rate, the ignition timing (injection timing), combustion timing loss, the engine speed, and the load), and leakage loss (caused by leakage between cylinders and pistons).

The term "loss due to mechanical components" refers to mechanical loss (friction between cylinders and pistons/piston rings, frictional loss from the crankshaft, camshaft, and other bearings, frictional loss between cams and cam followers, drive valve system loss, and pump loss) and auxiliary component loss (caused by the water pump, oil pump, ignition device, power steering pump, and air conditioning compressor).

In other words, the components of the computed mechanical loss torque are different for firing testing and motoring testing, and the loss due to mechanical components, and the pump loss and air intake system frictional loss among the losses due to combustion are computed as the mechanical loss torque during motoring testing. Computation of the mechanical loss torque during motoring testing will be described hereinafter, but for the sake of distinction, the mechanical loss torque during firing testing will be designated as $T_m$, and the mechanical loss torque during motoring testing will be designated as $T_{mm}$.

Returning to the description of the present example, the fuel torque $T_f$ is considered to be dependent on the fuel injection timing FT, and the mechanical loss torque $T_m$ is considered to be dependent on the engine speed N.

Accordingly, Equation (1) above modeled by the model computation unit 66 is substituted with $T_e = T_f - T_m$ ($T_f = Kf_1 \times (FT)^2 + Kf_2 \times (FT)$, $T_m = -(Km_1 \times (N) + Km_2)$). In other words, the engine torque $T_e$ is modeled using the engine parameters, whereby the engine torque $T_e$ is divided into a function (term that is dependent on the engine speed N) of the engine speed N and a function (term that is dependent on the fuel injection timing FT) of the fuel injection timing FT, and the fuel torque $T_f$ and mechanical loss torque $T_m$ during firing can be rapidly calculated in the transient state rather than in the steady state.

In the model computation unit 66, after Equation (1) is temporarily stored in the memory 62, the term that is dependent on the engine speed N in the model is extracted as the mechanical loss torque $T_m$, and the term that is dependent on the fuel injection timing FT is extracted as the fuel torque $T_f$, and the terms are again stored in the memory 62 or are outputted to the display unit 7.

The central control unit 5 feeds back the axial torque $T_d$ and engine speed N detected from the detector 2, and since the engine control unit 3 must be furthermore controlled so that testing is performed under the set testing conditions, the signal processing unit 6 of the present example also has a function (feedback control computation function) for computing the control signal for the engine control unit 3 and transmitting the control signal to the central control unit 5 on the basis of the signal inputted from the measurement unit 60. However, the feedback control computation is not necessarily performed in the signal processing unit 6, and the output from the detector 2 may be directly inputted to the central control unit 5 so that feedback control computation is performed within the central control unit 5.

The display unit 7 is a means for displaying the data measured by the measurement unit 60, and the results of computation by the torque computation unit 64 and the model computation unit 66. Specifically, the display unit 7 may display not only the items of measurement data or the computation results, but also a plurality of data function graphs, trajectories, correlation coefficient graphs, frequency distribution tables, standard deviation graphs, or the like. Multiple types and combinations of measurement data or computational results may, of course, be displayed on the same screen when the measurement data and the computation results occur simultaneously.

In the display unit 7, the engine torque $T_e$ when the fuel injection timing FT and the engine speed N are parameters, and the engine mechanical loss and other related characteristics are displayed as a graph, whereby the basic performance of the engine 10 can be visually assessed at a glance.

EXAMPLE 1

The overall operation of the engine measurement device 1 will be described hereinafter with reference to the flow diagram of FIG. 2. An example will be described in which the mechanical loss torque $T_m$ is calculated by the engine measurement device 1 of the present example from the relationship between the engine torque $T_e$ and the transient-state time series data of the fuel injection timing FT and the engine speed N during firing testing in which the engine 10 is combustion driven.

First, the engine measurement device 1 sets testing conditions whereby the transient-state time series data are obtained (S110). In the present example, the fuel injection timing FT is increased from 0 to 30 msec through control from the central control unit 5 and the engine control unit 3, and the engine speed N accordingly increases from 0 to approximately 4000 rpm.

The engine measurement device 1 executes firing testing under the abovementioned testing conditions, and the measurement unit 60 in the signal processing unit 6 collects the axial torque $T_d$ in the transient state and time series data of the fuel injection timing FT and the engine speed N from the detector 2, the engine control unit 3, or the like and stores the collected data in the memory 62 (S120). FIG. 3 shows a graph in which the collected time series data are shown for a period of 15 seconds from the start of measurement.

As described above, the time series data of the axial torque $T_d$ shown in FIG. 3 include noise components and components of the flywheel and other transmission system inertia, and filter processing and correction to the engine torque $T_e$ are therefore performed by the torque computation unit 64 (S130). The computation of the engine torque $T_e$ was performed using $T_e = T_d - I \times dN/dt$ (wherein $I = 0.17$ kgm$^2$), as described above. The graph shown in FIG. 4 is obtained by substituting the axial torque $T_d$ in the graph of FIG. 3 with the engine torque $T_e$.

The model computation unit 66 forms a model so that the engine torque $T_e$ becomes a function of the engine speed N and the fuel injection timing FT shown in the following equation on the basis of the time series data of the fuel injection timing FT, the engine speed N, and the engine torque $T_e$ (S140).

The model of the engine torque $T_e$ shown in FIG. 4 is indicated by the following equation.

$$\text{Estimated engine torque } T_{ee}(Nm) = (-0.02132 \pm 0.00066) \times (FT)^2 + (3.839 \pm 0.034) \times (FT) + (-0.004756 \pm 0.00026) \times N + (-34.04 \pm 0.39) \quad (2)$$

The reason for establishing the estimated engine torque $T_{ee}$ using Equation (2) is that the model in which the engine torque $T_e$ equals the right side of Equation (2) is not necessarily true during the entire period in which the engine torque $T_e$ measured, and there is a period during which a difference occurs between the actual engine torque $T_e$ and the computational results on the right side of the equation.

Furthermore, the model computation unit 66 computes the mechanical loss torque $T_m$ during firing on the basis of Equation (2) (S150). Specifically, the right side of Equation (2) is divided into terms that depend on the fuel injection timing FT and terms that depend on the engine speed N, and is fitted to the equation: Estimated engine torque $T_{ee}$ = fuel torque $T_f$ − mechanical loss torque $T_m$.

Equations (2-1) and (2-2) are then obtained from Equation (2).

$$T_f = -0.02132 \times (FT)2 + 3.839 \times FT \quad (2\text{-}1)$$

$$T_m = 0.004756 \times N + 34.04 \quad (2\text{-}2)$$

FIG. 5 is a graph in which the estimated engine torque $T_{ee}$, the fuel torque $T_f$, and the mechanical loss torque $T_m$ calculated in this manner, and the previous fuel injection timing FT and the engine torque $T_e$ are shown for a period of t=5 to 20 s by the display unit 7.

FIG. 5 shows the compatibility between the engine torque $T_e$ and the estimated engine torque $T_{ee}$ in a significant time range, and it is apparent that the reliability of the computed mechanical loss torque $T_m$ is maintained.

The display unit 7 displays graphs such as the ones shown in FIGS. 6 and 7. FIG. 6 is a graph showing the relationship between the engine torque $T_e$ and the fuel injection timing FT, and the relationship between the estimated engine torque $T_{ee}$ and the fuel injection timing FT for each representative engine speed N; FIG. 7A is a graph showing the relationship between the engine torque $T_e$ and the engine speed N, and the relationship between the estimated engine torque $T_{ee}$ and the engine speed N for each representative fuel injection timing FT; and FIG. 7B is a graph showing the relationship between the engine speed N and the computed mechanical loss torque $T_m$. FIG. 7B shows the mechanical loss torque $T_m$ computed when the engine torque $T_e$ is 0±5 Nm, but since the mechanical loss torque is indicated as a function of the engine speed N as described above, the value thereof is the same regardless of the value of the engine torque $T_e$.

It is readily apparent from the graph in FIG. 6 that there are regions in which the engine torque $T_e$ and the estimated engine torque $T_{ee}$ are negative even when fuel is injected. It is also readily apparent from the graph in FIG. 7 that the engine torque $T_e$ and the estimated engine torque $T_{ee}$ are negative when the fuel injection timing is 10 ms or less (FIG. 7A), and that the mechanical loss increases in substantially linear fashion when the engine speed is increased (FIG. 7B).

FIG. 8 shows the relationship between the engine torque $T_e$, the engine speed N, and the fuel consumption rate estimated on the basis of the measured/computed data thus far (including the engine torque $T_e$, the estimated engine torque $T_{ee}$, the fuel torque $T_f$, and the mechanical loss torque $T_m$). In FIG. 8, the fuel consumption rate is calculated by dividing the fuel injection timing FT by the engine torque $T_e$. It is thereby readily apparent that fuel consumption decreases as the engine speed increases, and that the rate of reduction in fuel consumption increases to the extent that the engine torque increases.

In the past, since testing to calculate the mechanical loss torque was performed without combustion-driving of the engine, it was impossible to measure the fuel torque as an input factor, and the mechanical loss that was calculated during combustion driving of the engine had insufficient accuracy. However, according to the present invention, the engine torque during firing is computed as a separate fuel torque and a mechanical loss torque, and the engine torque can also be computed in a short time using transient data. The engine torque can therefore be useful for enhancing the accuracy of ECU control for enhancing fuel consumption, and for other aspects of engine control.

EXAMPLE 2

Another embodiment of the present invention will be described hereinafter. The present example is of a case in which the engine measurement device 1a is used in motoring testing. The term "motoring testing" refers to testing in which the engine performance is measured in a non-combustion driving state of the engine 10 in which fuel is supplied but not combusted, i.e., a state in which the dynamometer 12 is driven.

The differences between the engine measurement device 1 of the previous example and the engine measurement device 1a of the present embodiment will be cited, but other structural aspects thereof are the same.

First, the components of the calculated mechanical loss torque differ between the engine measurement device 1 during firing testing and the engine measurement device 1a during motoring testing of the present example.

Specifically, in theory, the engine torque $T_e$ of the motoring testing is a torque obtained from the output shaft in the non-combustion driving state of the engine 10, and the fuel torque (input factor in firing testing) is therefore zero. In other words, motoring testing is unable to measure the air intake loss (not including the pump loss), the cooling loss, the loss due to incomplete combustion, and the leak loss, which are losses due to combustion during firing testing.

The mechanical loss torque $T_{mm}$ during motoring testing is the loss other than the losses described above, and includes the loss that is not due to combustion, such as the mechanical loss (friction between cylinders and pistons/piston rings, frictional loss from the crankshaft, camshaft, and other bearings, frictional loss between cams and cam followers, drive valve system loss, and pump loss) and auxiliary component loss (caused by the water pump, oil pump, ignition device, power steering pump, and air conditioning compressor).

The engine measurement device 1a is provided with the engine control unit 3, the central control unit 5, the signal processing unit 6, and the display unit 7 shown in FIG. 1, as well as a dynamometer control unit (external drive means control unit) 4 that is indicated by a dashed line in FIG. 1.

The dynamometer control unit 4 is connected to the dynamometer 12, and is a means for variably controlling the current/voltage applied to the dynamometer 12 during motoring testing in the present example. The current/voltage of the dynamometer 12 is variably controlled, whereby the dynamometer 12 is driven, and the load torque of the engine 10 that is connected to the dynamometer 12 is controlled.

The dynamometer 12 used in the present example is a low-inertia dynamometer, the same as in the previous example.

The engine control unit 3 also stops the supply of fuel and provides a prescribed throttle travel to the engine 10, and the dynamometer control unit 4 applies a current/voltage to the dynamometer 12 to control the driving of the dynamometer 12. Therefore, the dynamometer 12 can be considered to be an external drive means that substitutes for the engine 10.

The engine 10 acts as the load of the dynamometer 12, the cylinders of the engine 10 are driven at the rotational speed obtained through the driving of the dynamometer 12, and the air determined by the throttle travel is taken in/exhausted in the cylinders. In other words, the engine speed N is obtained through the control of the dynamometer 12 that is performed by the dynamometer control unit 4.

The engine speed N during motoring testing is detected from the detector 2, and may also be directly detected from the dynamometer 12, or may be detected based on information (applied voltage, current) from the dynamometer control unit 4.

The central control unit 5 of the present example controls the engine control unit 3, the signal processing unit 6, and the display unit 7, and is also a means for controlling the dynamometer control unit 4.

The central control unit 5 of the present example controls the engine control unit 3 and the dynamometer control unit 4 in the control process of the engine 10 and the dynamometer 12 so that at least two types of time series data that include time series data of the engine speed N in the non-constant transient state, and the axial torque $T_d$ that varies during the period of the transient state are measured from the detector 2.

The structure of the signal processing unit 6 is the same as in the previous example, but the processing of the model computation unit 66 differs from the processing performed during firing testing.

Specifically, the model computation unit 66 in the case of motoring testing models the engine torque $T_e$ as a function of the engine speed N, the air intake quantity, and other engine parameters on the basis of the time series data of the air intake quantity and the engine speed N (the rotational speed of the dynamometer 12 in the case of motoring testing) obtained from the measurement unit 60, and the time series data (which has all undergone the first data correction processing) of the engine torque $T_e$ obtained by the torque computation unit 64. The function of the engine speed N indicated by the following equation is obtained.

$$T_e = Kmm_1 \times N + Kmm_2 \text{ (wherein } Kmm_1 \text{ and } Kmm_2 \text{ are constants)} \quad (3)$$

As described above, in theory, the engine torque $T_e$ of the motoring testing is a torque obtained from the output shaft in the non-combustion driving state of the engine 10. In other words, the fuel torque that is the input in firing testing is zero, and the engine torque $T_e$ that contributes to engine driving when the dynamometer 12 is driven externally is all lost. Therefore $T_e$ can be considered equal to $-T_{mm}$ (mechanical loss torque) in motoring testing.

The mechanical loss torque $T_{mm}$ during motoring can thus be rapidly calculated using Equation (3) above in the transient state rather than in the steady state. The model computation unit 66 then stores Equation (3) in the memory 62 and outputs $T_e = -T_{mm}$ to the display unit 7.

The mechanical loss torque $T_{mm}$ may be computed as a term that depends on the engine speed N as in Equation (3), but this configuration is not limiting, and the mechanical loss torque $T_{mm}$ may also be expressed as a function of other engine parameters to extract the separate mechanical loss due to each engine parameter.

The central control unit 5 feeds back the axial torque $T_d$ and engine speed N detected from the detector 2, and since the engine control unit 3 and the dynamometer control unit 4 must be furthermore controlled so that testing is performed under the set testing conditions, the signal processing unit 6 of the present example also has a function (feedback control computation function) for computing the control signal for the engine control unit 3 and the dynamometer control unit 4 and transmitting the control signal to the central control unit 5 on the basis of the signal inputted from the measurement unit 60. However, the feedback control computation is not necessarily performed in the signal processing unit 6, and the output from the detector 2 may be directly inputted to the central control unit 5 so that feedback control computation is performed within the central control unit 5.

An example of the general operation of the engine measurement device 1a will next be described with reference to the flow diagram in FIG. 2. In the engine measurement device 1a of the present example, the engine 10 is not combustion driven, and the mechanical loss torque $T_{mm}$ is calculated from the relationship between the engine torque $T_e$ and the time series data in the transient state of the engine speed N in motoring testing in which the dynamometer 12 is driven with the throttle travel S held constant.

The engine measurement device 1a sets testing conditions whereby transient-state time series data can be obtained (S110). In the present example, the fuel injection quantity of the engine 10 is set to zero, and the throttle travel S is set to 30% through control from the central control unit 5 and the engine control unit 3, and the rotational speed of the dynamometer 12 (hereinafter the same as the engine speed N of the engine 10) is varied from 0 to 4000 to 0 rpm at a rate of 20 rpm/s through control from the dynamometer control unit 4. The rotational speed must be controlled in this manner so as to later efficiently correct for the effects of the inertia term of the torque transmission system from the time series data of the detected axial torque $T_d$.

The engine measurement device 1a executes motoring testing under the testing conditions described above, and the measurement unit 60 in the signal processing unit 6 collects the axial torque $T_d$ in the transient state and time series data of the air intake quantity and the engine speed N from the detector 2, the engine control unit 3, or the like and stores the collected data in the memory 62 (S120). FIG. 9 shows a graph in which the collected time series data are shown for a period of 400 seconds from the start of measurement.

As described above, the time series data of the axial torque $T_d$ shown in FIG. 9 include noise components and inertia components of the flywheel, pistons, crankshaft, and the like, and filter processing (high-frequency component removal, averaging, and the like) and correction to the engine torque $T_e$ are therefore performed by the torque computation unit 64 (S130).

The computation of the engine torque $T_e$ was performed using $T_e = T_d - I \times dN/dt$ as described above, but prior to this computation, the time series data of the axial torque $T_d$ were high-frequency analyzed and separated into a low-frequency component and a high-frequency component, and the high-frequency component was removed by a low-pass filter in the torque computation unit 64 in order to remove unbalanced inertia components (high-frequency secondary moment) due to the pistons, the crankshaft, and other components. When the high-frequency component that is superposed on such transient data is merely averaged, the high-frequency component is cancelled out to zero, the data are altered from the data that were to be used in the original evaluation, and a proper evaluation can no longer be performed. A method for separating the transient data into low frequencies and high frequencies and removing unnecessary components is therefore an essential technique for analysis and processing of transient data.

The same filter processing as described above must be performed for data (air intake quantity) other than the engine torque $T_e$. The reason for this is that a correct correlation cannot be obtained unless processing is performed under the same conditions when the correlation of both data sets is subsequently examined.

FIG. 10 is a graph in which the axial torque $T_d$ and the air intake quantity in the graph of FIG. 9 are subjected to filter processing, and the axial torque $T_d$ is substituted with the engine torque $T_e$. Even after such filter processing as the filter processing described above is performed, noise remains in the engine torque $T_e$ in the slow portions (0 to 40 s, 360 to 400 s) of the engine speed N. What occurs near 80 s, 160 s, 240 s, and 320 s is aliasing distortion (aliasing noise) that accompanies low-speed sampling during AD conversion of the measurement data.

The air intake quantity is examined before the time series data of the engine torque $T_e$ are modeled by the model computation unit 66. The air intake quantity is an indicator of the pump efficiency. FIG. 11A is a graph of the air intake quantity during the period in which the engine speed N is 2000 to 2300 rpm, based on the graph of FIG. 10.

In the present example, the engine speed N during motoring testing is varied from 0 to 4000 and 4000 to 0 so as to measure the data during increasing speed and during decreasing speed to enhance the precision of the measurement, and to examine the correlation between the data during increasing speed and the data during decreasing speed.

In FIG. 11A, the time axes are offset between the two data sets (for increasing and decreasing of the engine speed N), and since this difference occurs in conjunction with the measurement, correction is performed by the torque computation unit 64 and the model computation unit 66 so as to align the time axis of one data set A with the time axis of the other data set B. The results of performing this time axis correction are shown in FIG. 11B. The solid line C in FIGS. 11A and 11B is the linear slope of data set A as extended from the starting point of data set B.

As in the case of the axial torque $T_d$, the air intake quantity corrected as shown in FIG. 11C is divided into a low-frequency component and a high-frequency component, and the high-frequency component is removed by a low-pass filter. The results are shown in FIG. 11C. The relationship between the engine speed N and the air intake quantity per cycle of the engine 10 was calculated based on FIG. 11C, and is shown in FIG. 11D.

It is apparent from FIGS. 11C and 11D that the air intake quantity per cycle is unrelated to the engine speed N and substantially constant. In other words, the engine torque $T_e$ is not dependent on the air intake quantity in the present example.

The engine torque $T_e$ shown in FIG. 10 is considered to indicate the mechanical loss when combustion is not taking place in the engine, and the pump loss that cannot be separated for measurement, but the results in FIGS. 11C and 11D may indicate that the engine torque $T_e$ is dependent on the engine speed N rather than on the air intake quantity. Consequently, the model computation unit 66 models the time series data of the engine torque $T_e$ shown in FIG. 10 as a function of the engine speed N to calculate the mechanical loss torque $T_{mm}$ (S140, S150).

FIG. 12 is a graph showing the relationship between the engine torque $T_e$ and the engine speed N. According to FIG. 12, a secondary approximate model of the engine-speed-dependent mechanical loss torque $T_{mm}$ is indicated by the following equation.

$$\text{Mechanical loss torque } T_{mm}(Nm)=8.49+0.000508 \times N+ 0.801 \times N^2 \quad (4)$$

A primary approximate model in the range of N=1000 to 4000 rpm is indicated by the following equation.

$$\text{Mechanical loss torque } T_{mm}(Nm)=3.80+0.004653 \times N \quad (5)$$

These computed models are stored in the memory 62 or outputted to the display unit 7.

Strictly speaking, since the mechanical loss is separated into factors that depend on engine speed, as well as factors that depend on temperature, air, and the like, the dependent factor that is incorporated for functional modeling of the mechanical loss can be arbitrarily selected using a statistical indicator according to the purpose of the testing/evaluation, and the flexibility of the testing/evaluation increases. When present statistical indicators are used, it is apparent that the factors that significantly affect the mechanical loss are air intake quantity, the product of engine speed and air intake quantity, coolant outlet temperature, and the product of engine speed and engine speed.

FIG. 13 is a graph showing the relationship between the engine torque $T_e$, the coolant outlet temperature, the oil temperature, and the exhaust temperature of the fuel gas during the period of 163 to 198 s during motoring testing in Example 2. Since combustion does not occur in the engine during motoring testing, the data for the coolant outlet temperature or oil temperature are basically unrelated to the engine evaluation, but combustion was occurring in the engine immediately prior to the motoring testing of the present example, and these data were therefore measured as they naturally progressed.

FIG. 14 is a graph showing the engine torque, the engine speed, the coolant outlet temperature, the lubricant oil temperature, the combustion gas exhaust temperature, and the air intake quantity at the same time as measured by the measurement unit 60 for a period of 180 to 200 s (i.e., when the throttle travel is 30%) when the throttle travel is varied in sequence to 0, 20, 40, 60, 80, 90, 70, 50, 30, and 10% every 20 s for a measurement period of 200 s according to the operating pattern shown in FIG. 16 for the purpose of forcibly varying each engine parameter, and the engine speed at the time of each throttle travel is varied from 0 to 5000 to 0 rpm at a rate of 500 rpm/s. When motoring testing is performed according to such an operating pattern, the transient data of various values can be acquired in a short time.

FIG. 14A shows the measurement data prior to correction, and FIG. 14B shows the results of correcting (2 Hz low-pass filter) the pressure on the pistons or the inertia of the pistons/crankshaft, correcting (correction using the time differential and inertial moment of the engine speed) the flywheel/shaft inertia, correcting (time axis adjustment for delays of 1.09 s and 0.02 s) the time delay of the air intake quantity/engine speed occurring due to measurement, and various other correction processing for the measurement data in FIG. 14A. Actually, besides the data shown in FIG. 14 when the throttle travel was 30%, all the throttle travel data when testing was performed according to the operation pattern shown in FIG. 16 was measured and stored in the memory 62.

FIG. 15 is a graph showing the results of analysis by the model computation unit 66 on the basis of the measurement results of FIG. 14 to separate the engine torque $T_e$ (mechanical loss torque $T_{mm}$) into the loss due to engine speed, the loss due to lubricant oil temperature, the loss due to air intake quantity, and the loss due to air movement. In other words, a coefficient (constant) is set by the model computation unit 66 so that the engine torque $T_e$ is indicated as a relationship of the engine parameters of engine speed, lubricant oil temperature, and air intake quantity, the model and the coefficients thereof are stored in the memory 62, and the computed value of each factor is displayed by the display unit 7. The inertial moment I used to calculate the engine torque $T_e$ from the axial torque $T_d$ was 0.17 kgm$^2$.

The loss due to the air intake quantity is the loss that occurs when air is taken into a cylinder, and is proportional to the air intake quantity/intake air pressure. Therefore, the loss corresponds to the factor that depends on the air intake quantity in the created model function. The loss due to air movement is a loss that occurs when air is taken in and exhausted, and is proportional to the amount of moving air. Since the quantity of moving air is indicated by (Air intake quantity×Engine speed), the loss corresponds to the factor that depends on the (Air intake quantity×Engine speed) in the created model function.

EXAMPLE 3

The above descriptions were of a case in which the mechanical loss torque $T_m$ during firing testing was calculated using transient-state time series data, and a case in which the breakdown (the dependent factors for each engine parameter) of the mechanical loss torque $T_{mm}$ during motoring testing was calculated.

As described above, the details of the mechanical loss torque $T_m$ calculated during firing testing differ from the details of the mechanical loss torque $T_{mm}$ calculated during motoring testing.

First, $T_m$ represents all the loss that does not contribute to engine driving during combustion driving of the engine 10, but since calculating the mechanical loss during firing testing was originally assumed to be impossible, the fact that the mechanical loss torque $T_m$ was calculated can be considered meaningful. Additionally, the facts that the loss (intake and exhaust loss, cooling loss, loss due to incomplete combustion, and other loss) due to combustion obviously cannot be calculated except by firing testing, and that the combustion efficiency or the exhaust gas characteristics can be analyzed from the mechanical loss torque $T_m$ are cited as effects that are obtained by using the engine measurement device 1 of the present invention.

Since $T_{mm}$ also represents the loss that does not contribute to engine driving during non-combustion driving of the engine 10, the abovementioned loss due to combustion is obviously included in $T_{mm}$. However, the mechanical loss other than the abovementioned loss due to combustion can be separated into the factor that depends on the engine speed, factors that depend on temperature, factors that depend on air, and other dependent factors for each engine parameter and calculated from $T_{mm}$ and used to evaluate performance in engine testing.

The ability to immediately compute the mechanical loss from the transient-state time series data is a characteristic that is shared between $T_m$ and $T_{mm}$. Another advantage of using transient data is that the data can be used in common for engine analysis that includes computation of mechanical loss and computation of mechanical loss for each factor when a plurality of items of temporally non-continuous data having different measurement conditions is linked.

For example, FIG. 14 described above is a graph showing the engine torque, the engine speed, the coolant outlet temperature, the lubricant oil temperature, the combustion gas exhaust temperature, and the air intake quantity at the same time as measured by the measurement unit 60 for a period of 180 to 200 s (i.e., when the throttle travel is 30%) when the throttle travel is varied in sequence to 0, 20, 40, 60, 80, 90, 70, 50, 30, and 10% every 20 s for a measurement period of 200 s according to the operating pattern shown in FIG. 16 for the purpose of forcibly varying each engine parameter, and the engine speed at the time of each throttle travel is varied from 0 to 5000 to 0 rpm at a rate of 500 rpm/s.

The measurement conditions (in this case, the throttle travel) may be continuously varied in this manner to measure the time series data, but there is not necessarily a temporal continuity between different measurement conditions, and the items of time series data that are measured by the measurement unit 60 for each throttle travel and stored in the memory 62 may be linked as if to have temporal continuity and used in engine analysis. When this configuration is adopted, each item of time series data that was stored in the memory 62 for the time being can be appropriately linked in the signal processing unit 6 at the later convenience of the analyzer and used in analysis, and the continuous process from measurement to analysis is no longer necessarily needed.

FIG. 17 shows a graph in which temporally non-continuous time series data having different measurement conditions are linked. Separate analysis for each engine parameter of the engine torque $T_e$ (mechanical loss torque $T_{mm}$) such as is shown in FIG. 15 is also possible from the graph of FIG. 17. Such an analysis method is impossible in analysis of steady-state data.

Furthermore, processing for comparing the results of modeling the mechanical loss torque $T_m$ in Example 1 with the results of modeling the mechanical loss torque $T_{mm}$ in Example 2 is performed in the engine measurement devices 1, 1a of the present invention, whereby the validity and consistency of the data sets obtained by firing testing and motoring testing can be verified.

Specifically, the mechanical loss torque $T_m$ during firing testing was modeled by Equation (2-2) as $T_m = 0.004756 \times N + 34.04$, and the mechanical loss torque $T_{mm}$ during motoring testing was modeled by Equation (5) as $T_{mm} = 3.80 + 0.004653 \times N$. When these models are compared, it is apparent that the dependent coefficients of the engine speed N for the models are 0.004653 and 0.004756, and are quite similar.

In other words, the mechanical loss models obtained by different testing methods using the engine measurement devices 1, 1a of the present invention are valid, and there is consistency between the mechanical loss torque $T_m$ and the mechanical loss torque $T_{mm}$, which have different component factors.

Since $T_m$ and $T_{mm}$ can be treated as data in the same dimension, different mechanical loss data resulting from different tests can be appropriately combined and used for engine analysis. For example, it is possible to calculate only the loss due to combustion within $T_m$ by subtracting $T_{mm}$ from $T_m$. This result could not be calculated in the past from the results of the independent firing testing and motoring testing.

Not only is the mechanical loss during firing testing calculated, and separate computation of the mechanical loss for each engine parameter during motoring testing performed rapidly using the transient-state time series data, but the ability to combine the different test results of firing testing and motoring testing makes it possible to fully anticipate contribution to the development of an engine/ECU that is adapted to the future low-energy age.

As described above regarding the examples of the engine measurement device, the engine measurement device of the present invention is not limited to an engine measurement device that is provided with all of the structural requirements described in the examples above, and various changes and modifications are possible. Such changes and modifications are also, of course, encompassed by the range of the claims of the present invention. For example, the engine measurement devices 1, 1a may be formed separate from each other, or may be configured as a single device (single system) in which the functions of each are combined, and firing testing and motoring testing can be appropriately selected.

It is also apparent that the torque computation unit 64 and the model computation unit 66 may include, for example, a noise remover (filter) for removing data noise (including components that are not needed for evaluating engine performance), an arithmetic unit, a calculus unit, an averaging computation unit, a standard deviation computation unit, a unit for measuring data frequency or the like (counter), an approximate expression computer, a frequency/delay time/correlation coefficient analyzer (FFT, impulse response, cross-spectral), and other publicly known computation units. These publicly known computation units may be included in the signal processing unit 6, and the torque computation unit 64 and the model computation unit 66 may be configured so as to call for computational processing by these computation units as needed. When the signal processing unit 6 itself is composed of a computation device, the abovementioned primary data correction processing or the check processing and other processing performed prior to modeling may be performed

Figure 1:
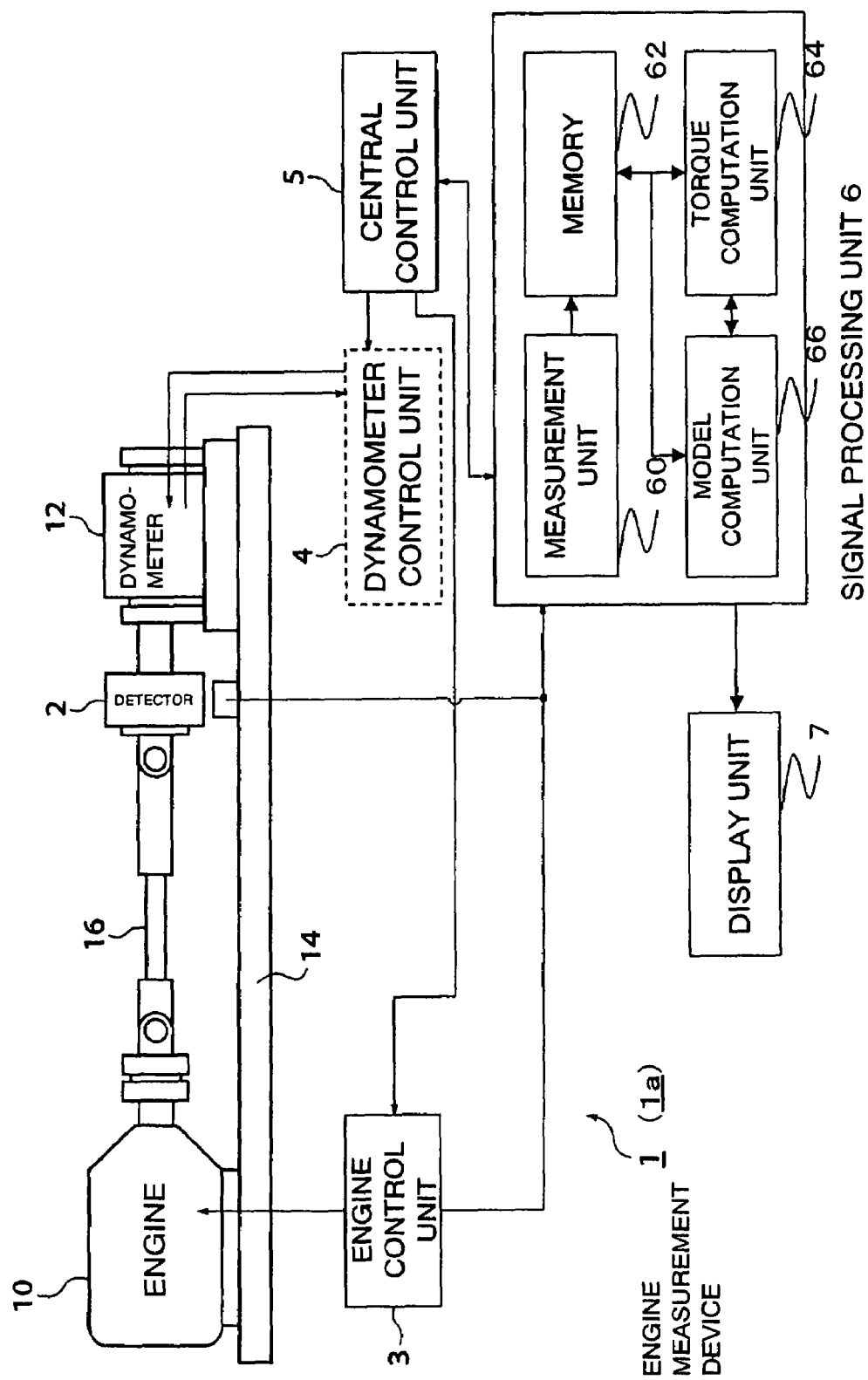
FIG. 1 is a diagram showing the structure of the engine measurement device.
Figure 2:
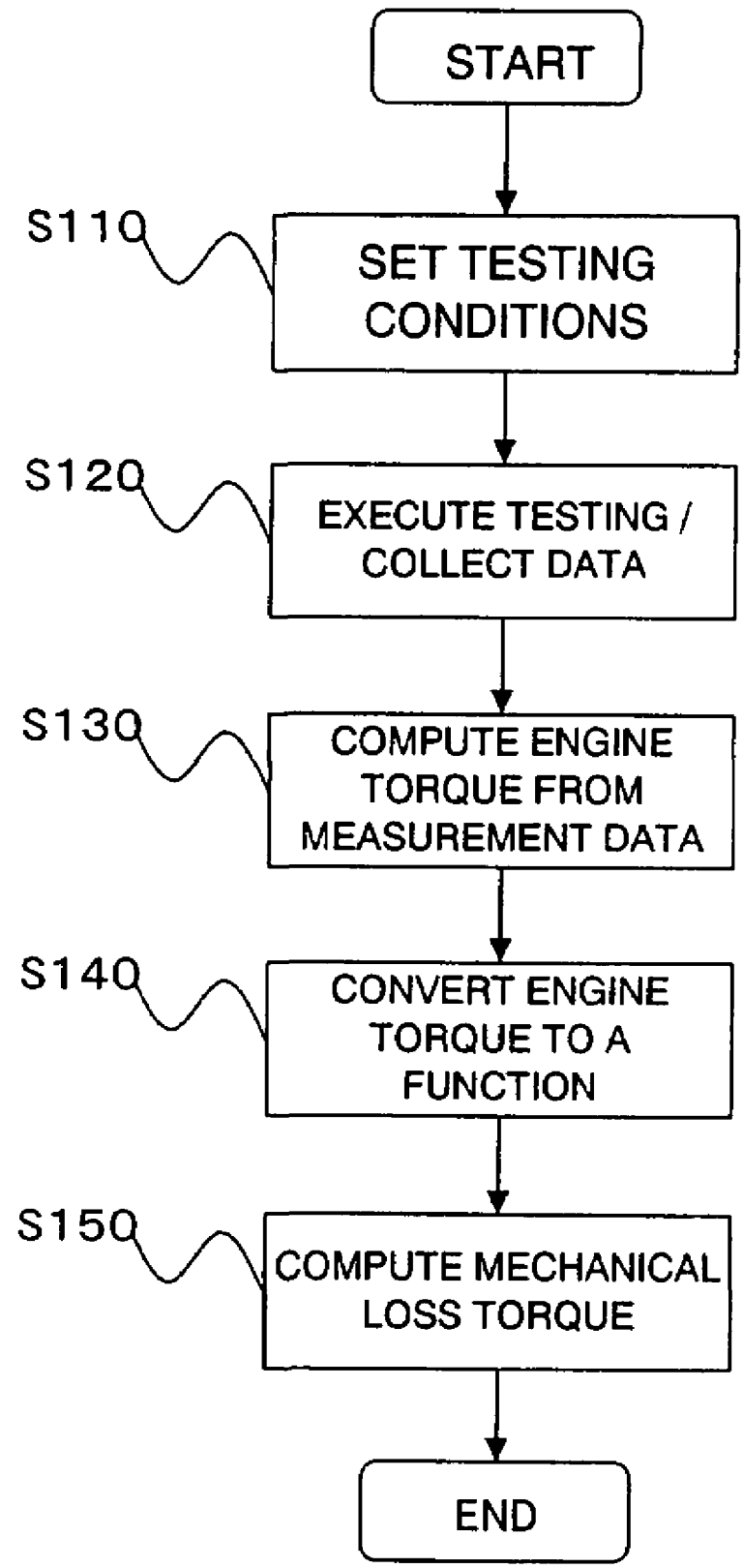
FIG. 2 is a flow diagram showing the general operation of the engine measurement device.
Figure 3:
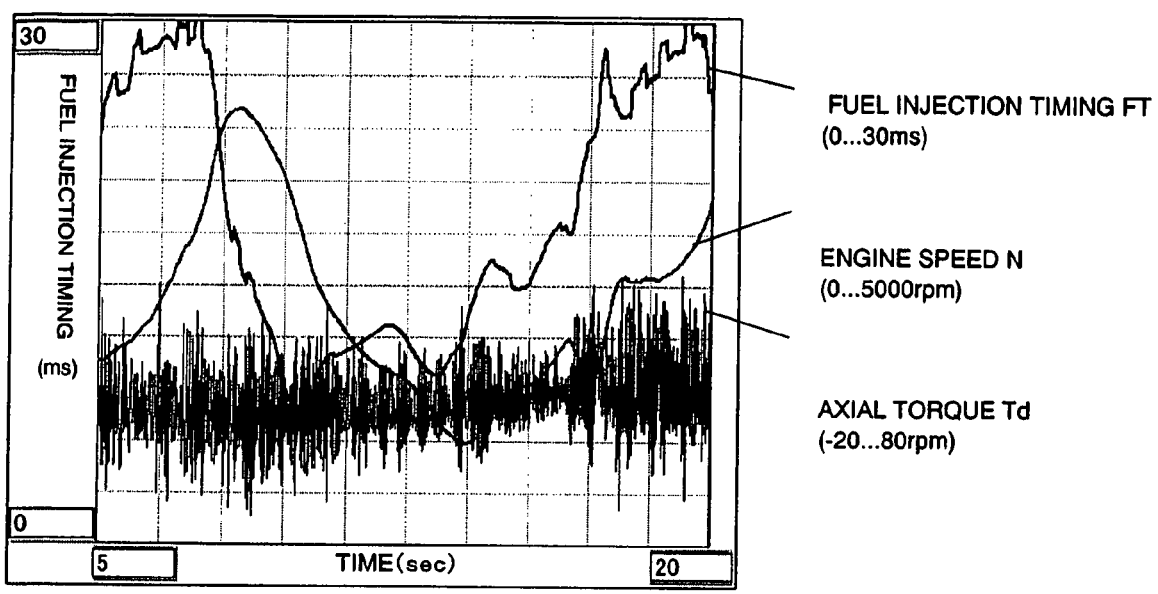
FIG. 3 is a graph showing the relationship between the axial torque, the fuel injection timing, and the engine speed during firing testing.
Figure 4:
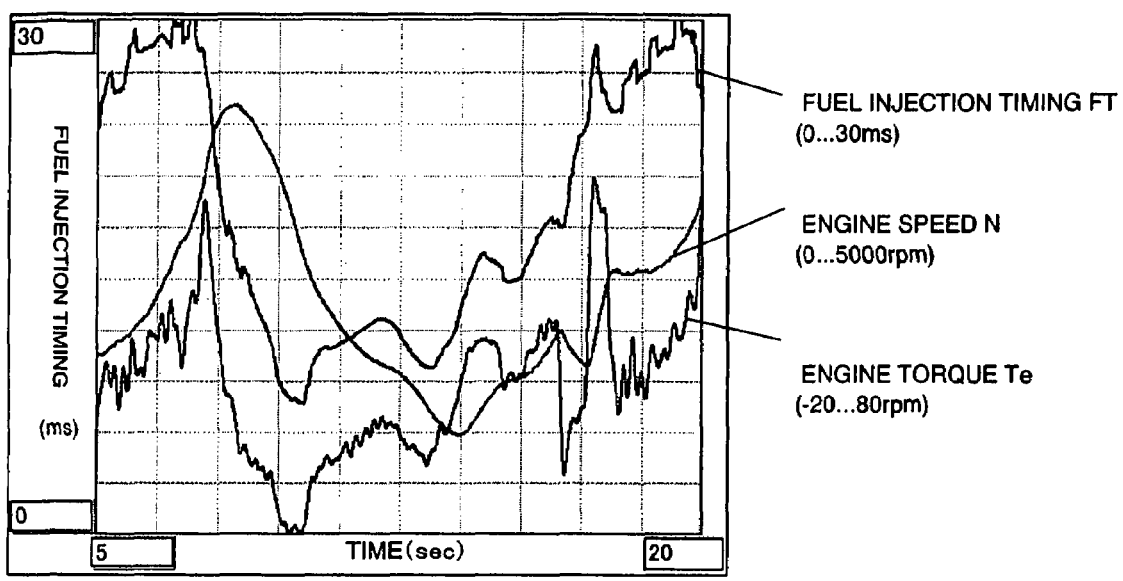
FIG. 4 is a graph showing the relationship between the engine torque, the fuel injection timing, and the engine speed during firing testing.
Figure 5:
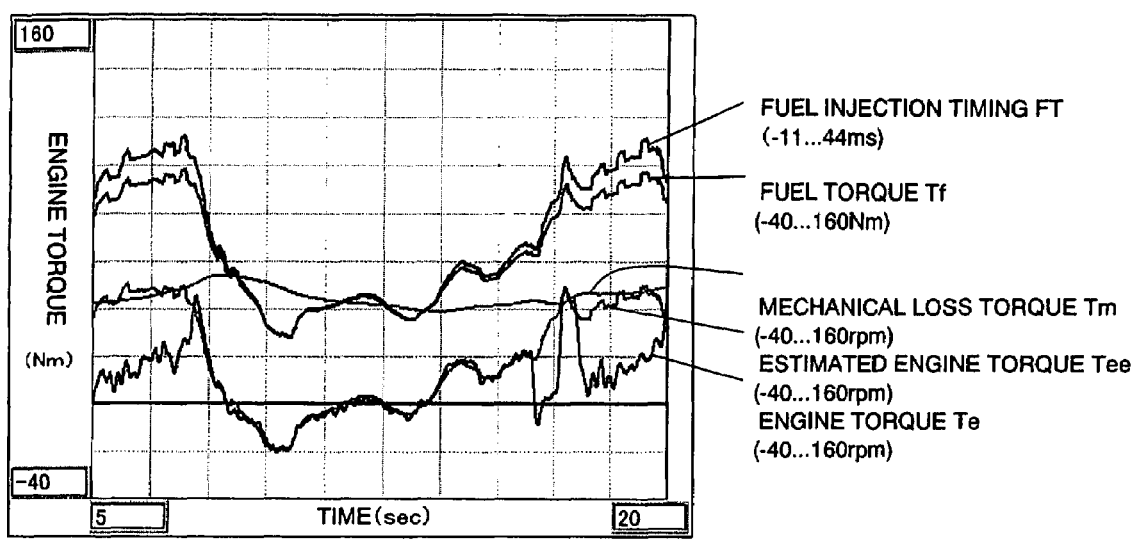
FIG. 5 is a graph showing the relationship between the engine torque, the estimated engine torque, the fuel injection timing, the fuel torque and the mechanical loss torque during firing testing.
Figure 6:
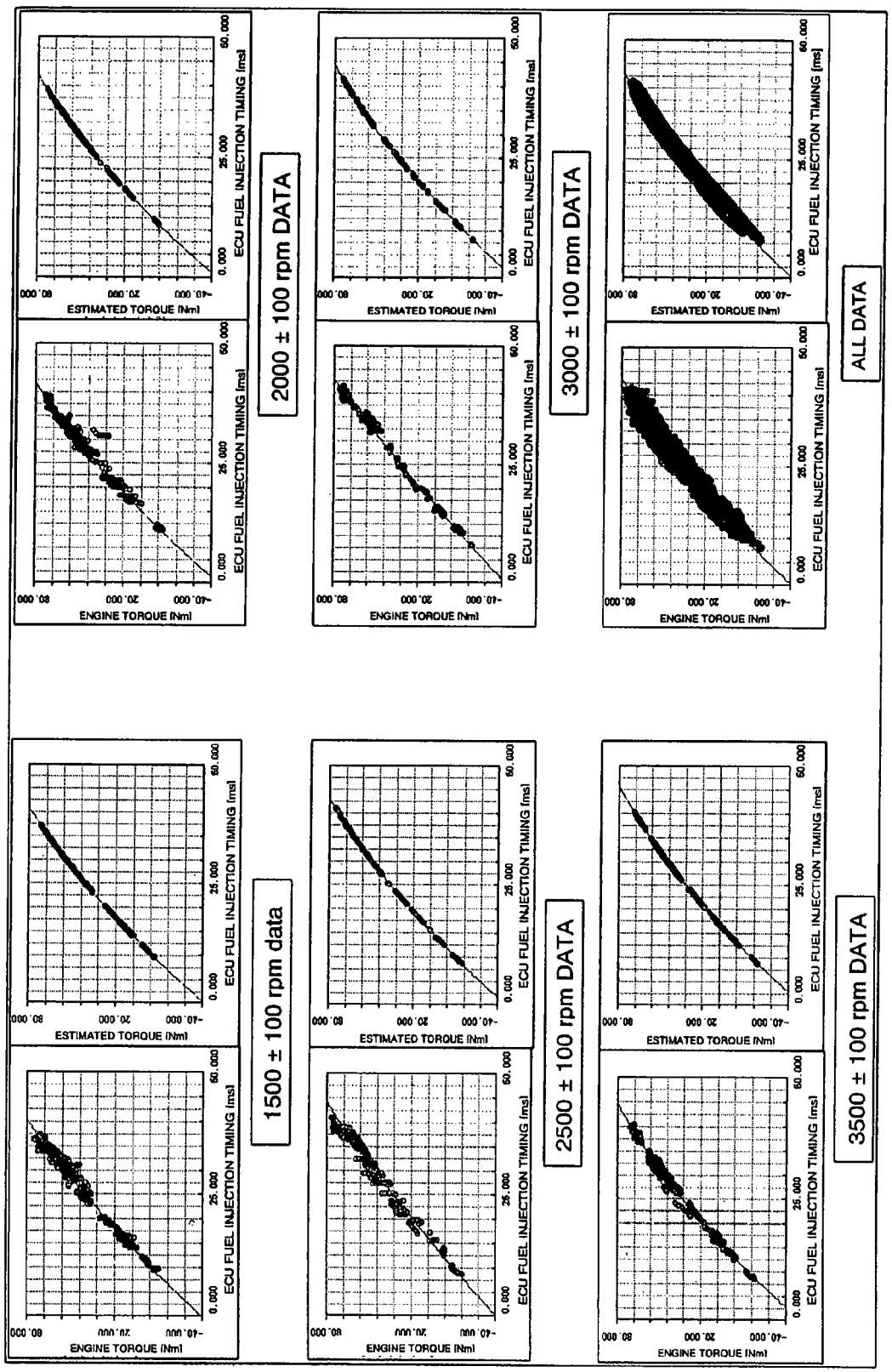
FIG. 6 is a graph showing the relationship between the engine torque and the fuel injection timing, and the relationship between the estimated engine torque and the fuel injection timing for each engine speed.
Figure 7:
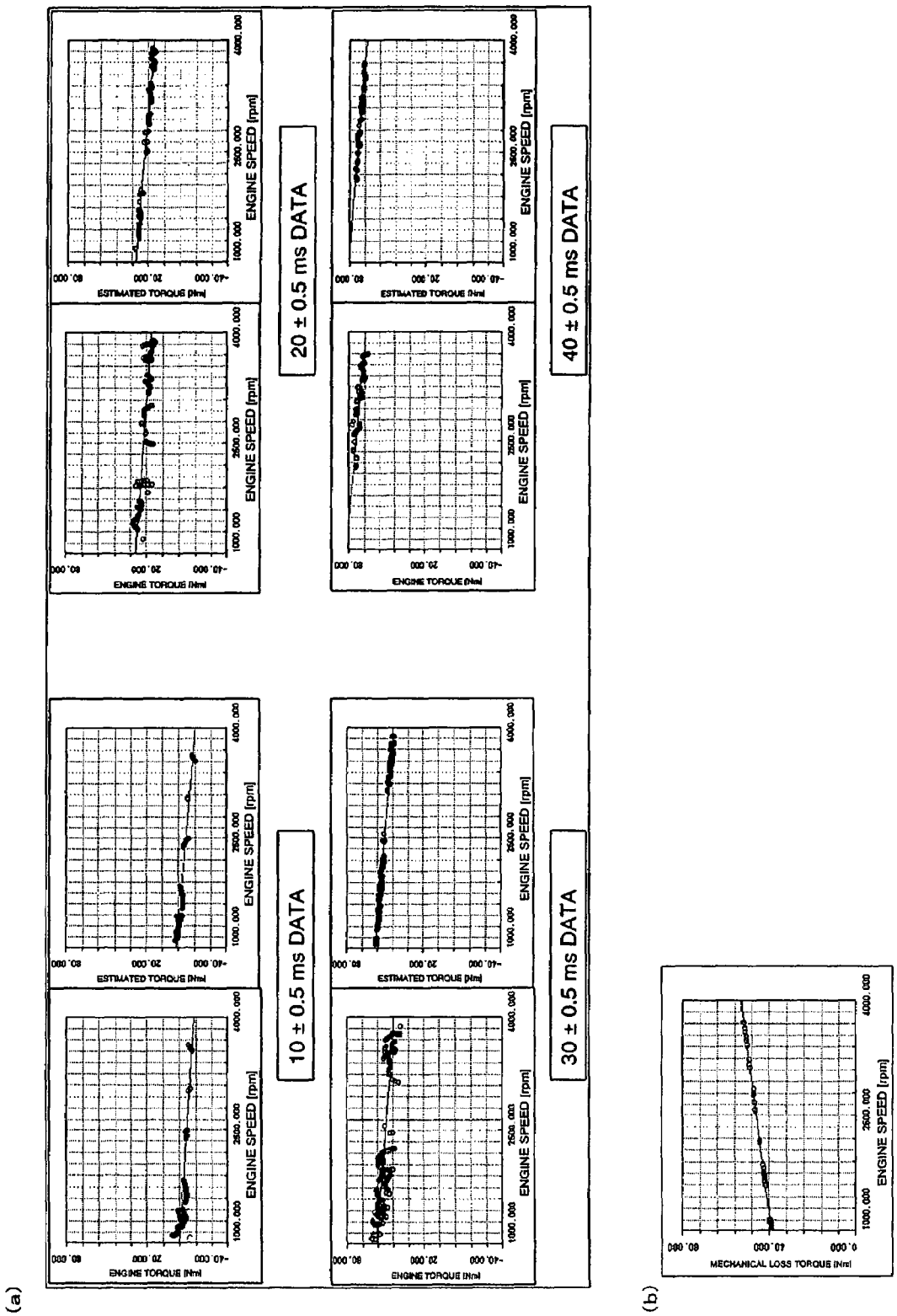
FIG. 7 is a graph showing the relationship between the engine torque, the mechanical loss torque, and the engine speed, and the relationship between the estimated engine torque, the mechanical loss torque, and the engine speed for each fuel injection timing.
Figure 8:
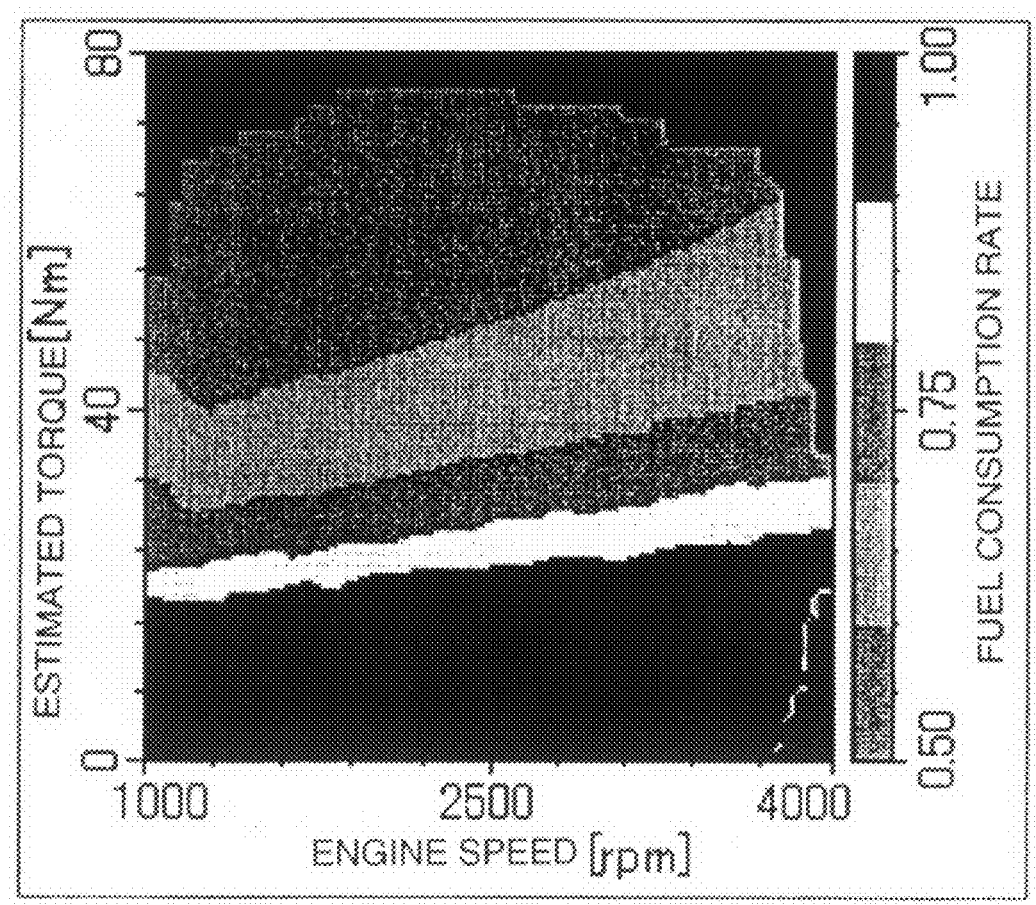
FIG. 8 is a graph showing the relationship between the estimated fuel consumption rate, the engine speed, and the estimated engine torque.
Figure 9:
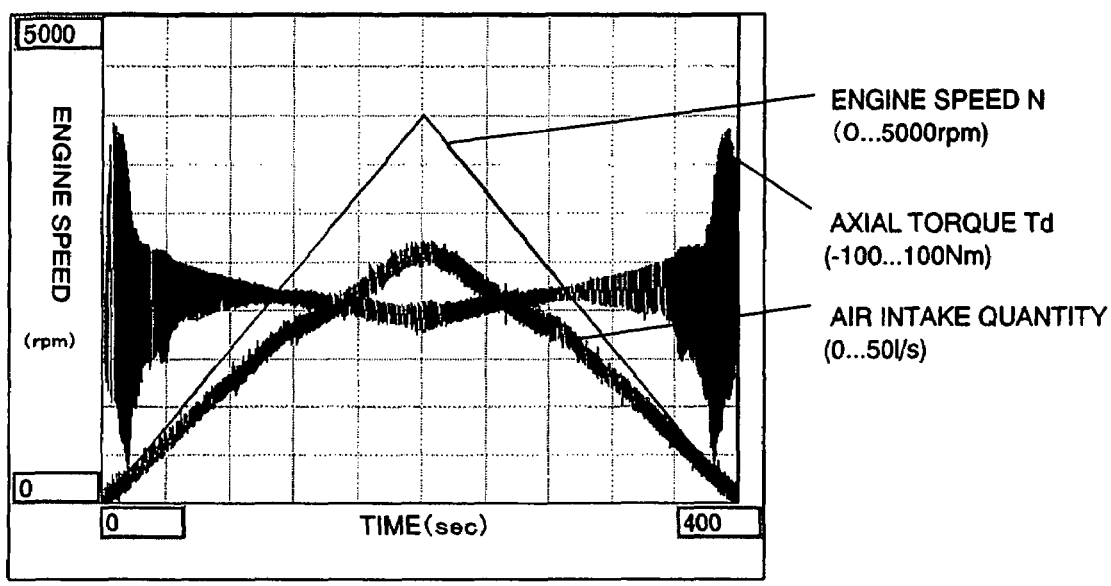
FIG. 9 is graph showing the relationship between the axial torque, the engine speed, and the air intake quantity during motoring testing.
Figure 10:
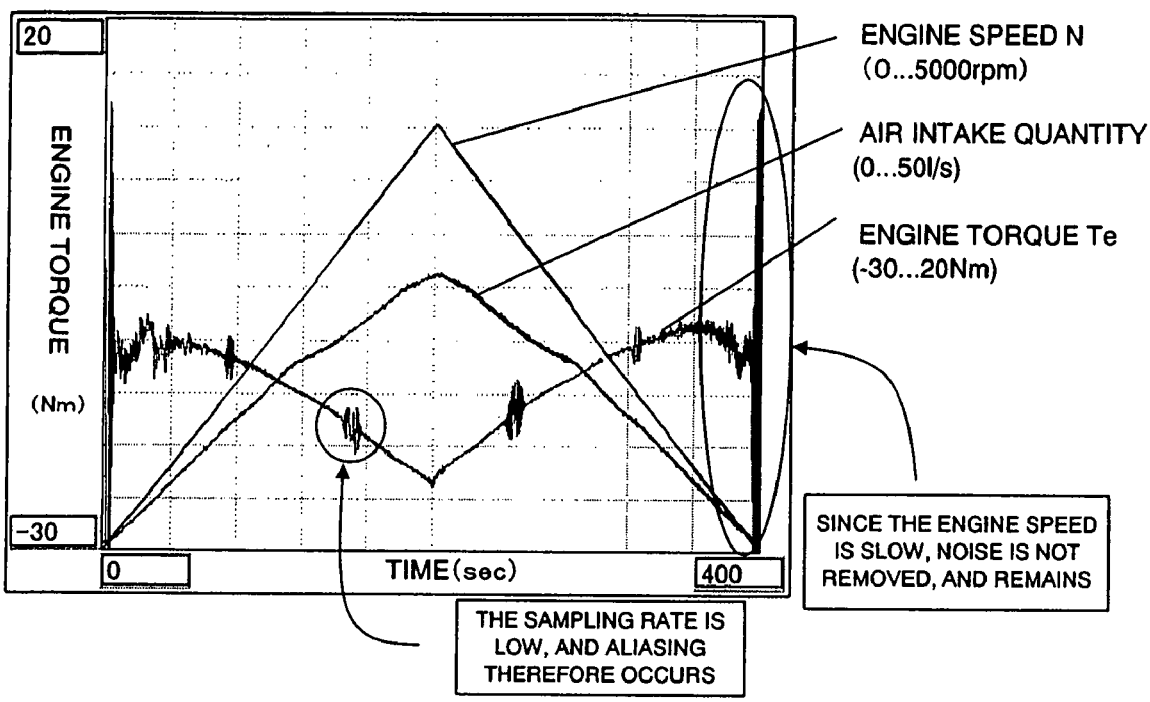
FIG. 10 is a graph showing the relationship between the engine torque, the engine speed, and the air intake quantity during motoring testing.
Figure 11:
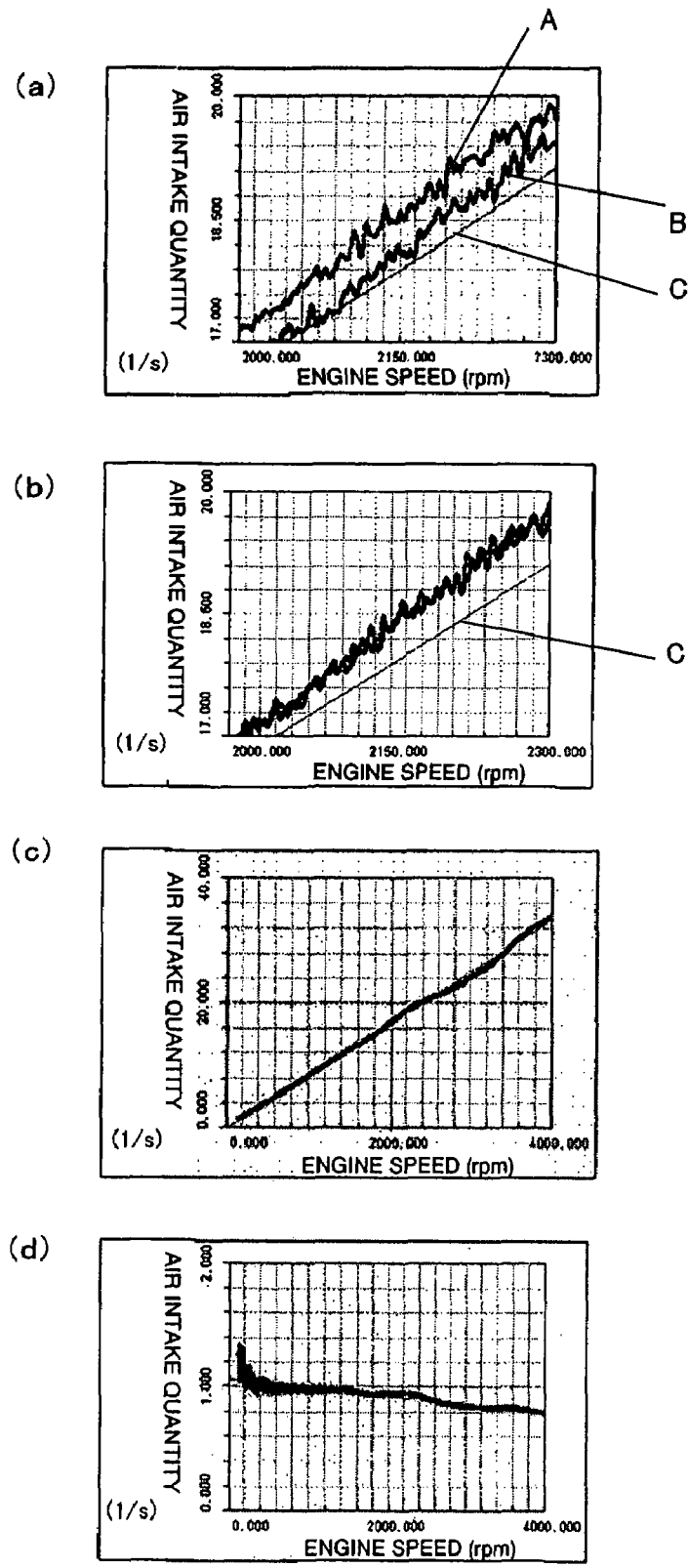
FIG. 11 is a graph showing the relationship between the engine speed and the air intake quantity.
Figure 12:
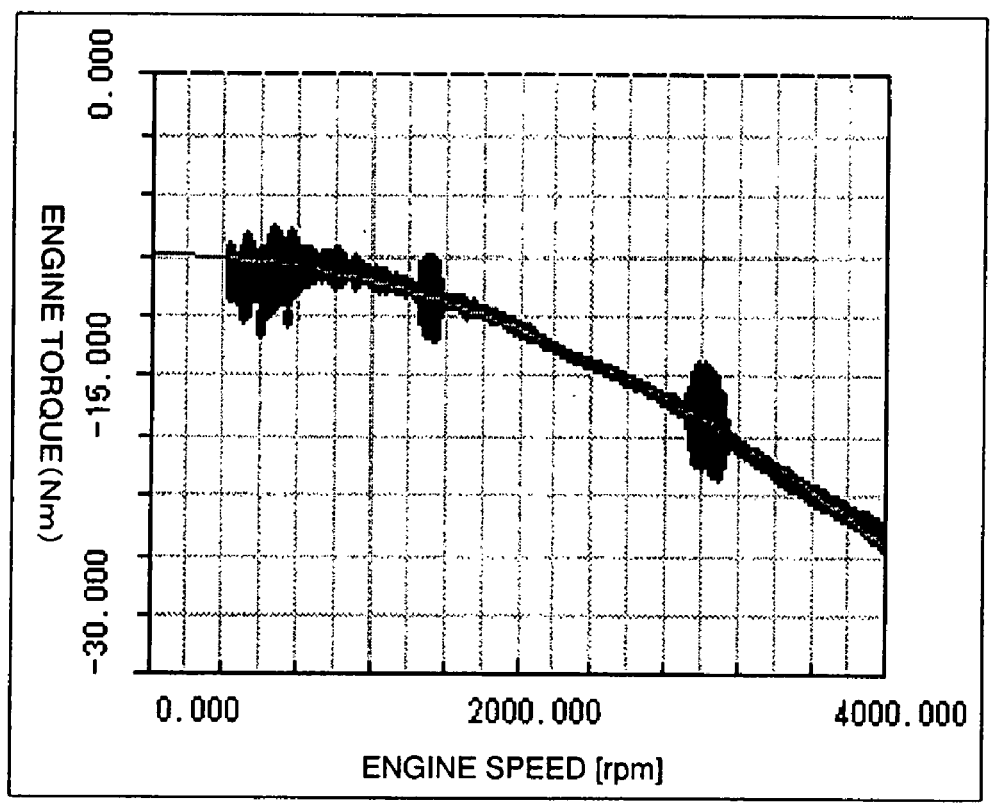
FIG. 12 is a graph showing the relationship between the engine torque and the engine speed.
Figure 13:
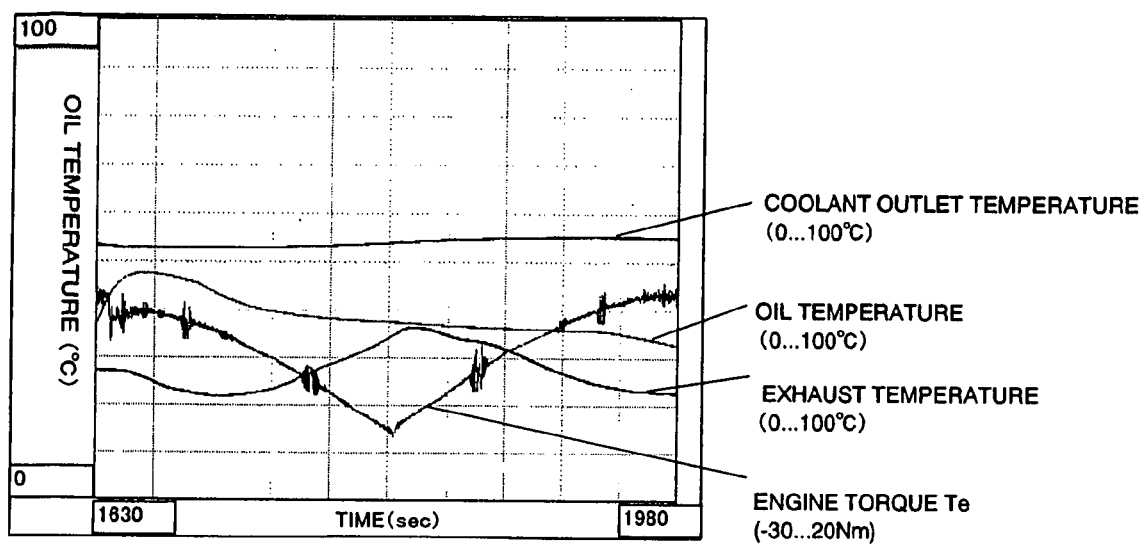
FIG. 13 is a graph showing the relationship between the engine torque, the coolant outlet temperature, the oil temperature, and the combustion gas exhaust temperature during motoring testing.
Figure 14:
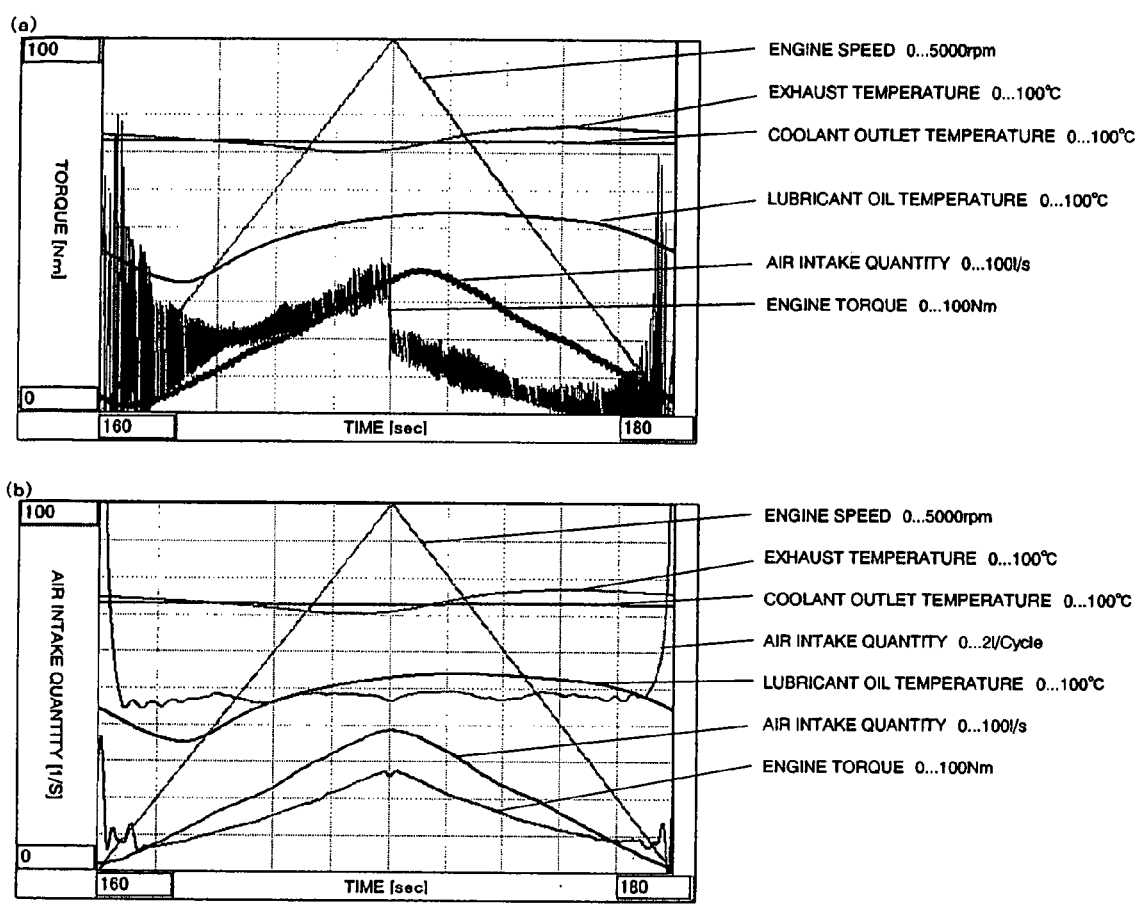
FIG. 14 is a graph showing the engine torque, the engine speed, the coolant outlet temperature, the lubricant oil temperature, the combustion gas exhaust temperature, and the intake air quantity during the period when the throttle travel is 30% when the throttle travel and the engine speed are varied during motoring testing.
Figure 15:
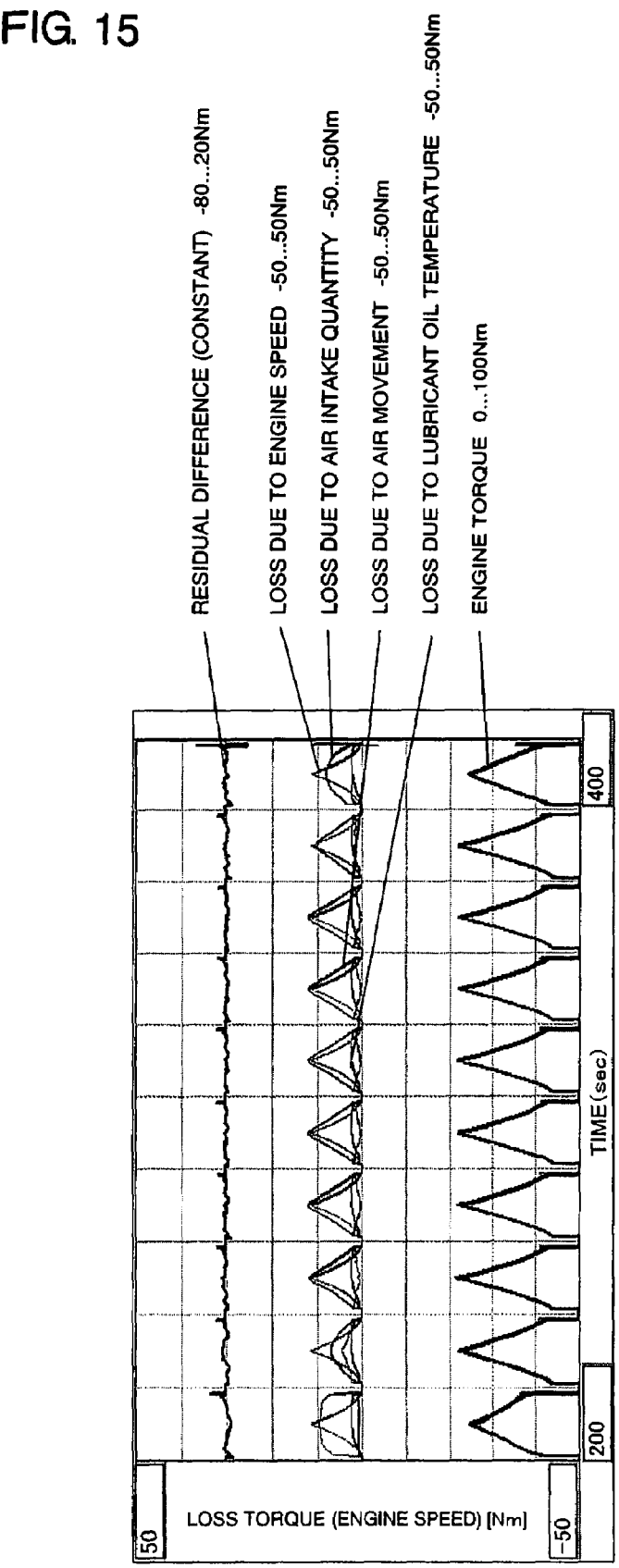
FIG. 15 is a graph showing the results of analysis to separate the engine torque (mechanical loss) into the loss due to engine speed, the loss due to lubricant oil temperature, the loss due to air intake quantity, and the loss due to air movement.
Figure 16:
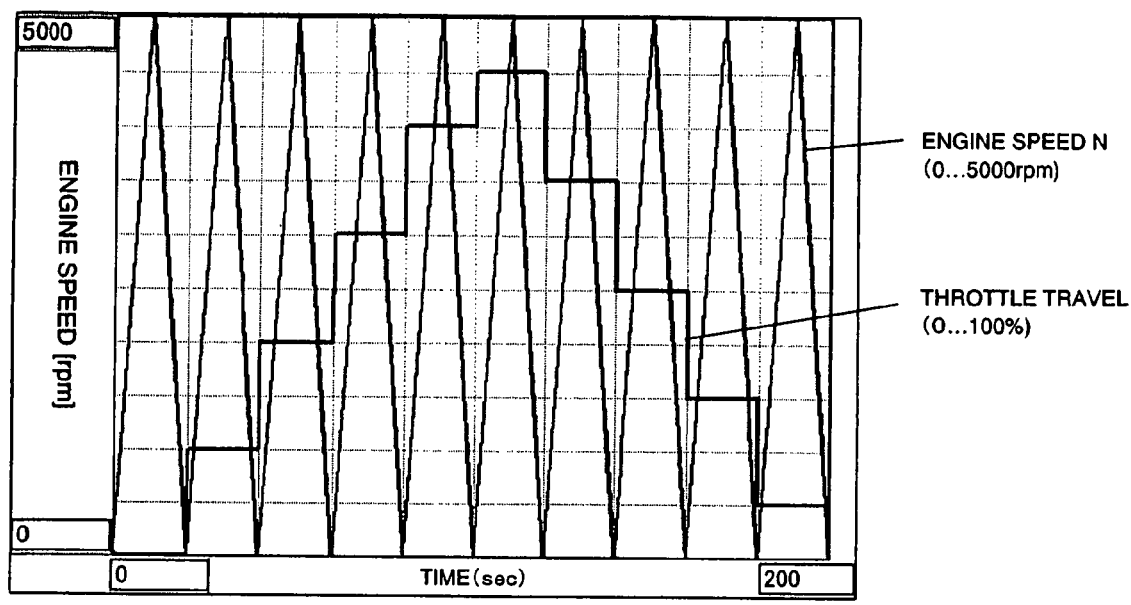
FIG. 16 is a graph showing the operating pattern of the motoring testing performed in order to obtain the measurement data that are shown in FIG. 15.
Figure 17:
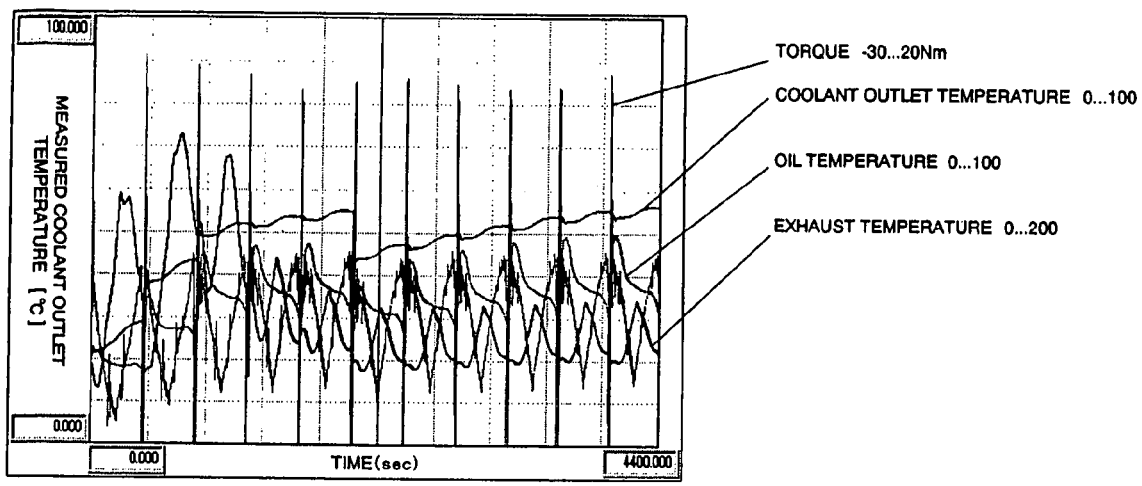
FIG. 17 is a graph in which temporally non-continuous time series data having different measurement conditions are linked.

DESCRIPTION OF THE NUMERICAL SYMBOLS 1, 1a: engine measurement device
10: engine
12: dynamometer
14: stand
16: torque transmission shaft
16a: universal joint
2: detector
3: engine control unit
4: dynamometer control unit
5: central control unit
6: signal processing unit
60: measurement unit
62: memory
64: torque computation unit
66: model computation unit
7: display unit

The invention claimed is:

1. An engine measurement device for measuring engine performance by bench testing an automobile engine having a load connected to said engine, said engine measurement device comprising:
    an engine control unit for controlling a fuel injection timing of said engine;
    a detector for measuring time series data that include at least an engine speed of said engine and an axial torque detected between said engine and a load in a transient state, in a state in which said engine is combustion-driven by the control of said engine control unit;
    a torque computation unit for computing an engine torque that is an actual drive force of said engine on a basis of the time series data of said engine speed and axial torque; and
    a model computation unit for modeling said engine torque using a model and engine parameters including said engine speed, and said fuel injection timing; wherein
    a fuel torque generated by the combustion driving of said engine, and a mechanical loss torque that is a difference between said engine torque and said fuel torque are calculated from said model.

2. The engine measurement device according to claim 1, wherein said model is a function of said engine parameters.

3. The engine measurement device according to claim 1, wherein said engine measurement device comprises a display unit for displaying said computed engine torque, mechanical loss torque, fuel torque, and any two or more of said engine parameters.

4. The engine measurement device according to claim 1, wherein said torque computation unit computes said engine torque by performing computational processing that includes time differentiation of the time series data of said engine speed.

5. The engine measurement device according to claim 1, wherein:
    said torque computation unit comprises a filter processing unit for removing the effects of a moment of inertia that is included in said time series data; and
    said filter processing unit performs frequency analysis of said time series data to separate the time series data into a low-frequency component and a high-frequency component, and removes the high-frequency component using a low-pass filter.

6. The engine measurement device according to claim 1, wherein the model computation unit determines constants $Kf_1$, $Kf_2$, $Km_1$, and $Km_2$ so as to conform to the function:

Engine torque $T_e=(Kf_1\times(FT)^2+Kf_2\times(FT))+(Km_1\times(N)+Km_2)$ wherein N is the engine speed and FT is fuel injection timing and are engine parameters.

7. The engine measurement device according to claim 6, said engine measurement device wherein:
the mechanical loss torque is $T_m$ and $T_m=-(Km_1\times(N)+Km_2)$.

8. An engine measurement device for measuring engine performance by bench testing an automobile engine having an external driving means connected to said engine, said engine measurement device comprising:
an engine control unit for controlling a throttle travel of said engine;
an external driving means control unit for controlling said external driving means;
a detector for measuring time series data that include at least an engine speed of said engine and an axial torque detected between said engine and the external driving means in a transient state, in a non-combustion drive state in which said external driving means is driven by the control of said engine control unit and the external driving means control unit;
a torque computation unit for computing an engine torque that is an actual drive force of said engine as a mechanical loss torque that occurs during said non-combustion driving, on a basis of the time series data of said engine speed and axial torque; and
a model computation unit for modeling said mechanical loss torque using a model and engine parameters including said engine speed, an engine oil temperature, and an intake air quantity; wherein
said mechanical loss torque is computed from said model for each of said engine parameters.

9. The engine measurement device according to claim 8, wherein the model computation unit indicates the engine speed as N as an engine parameter, and indicates the mechanical loss torque as $T_{mm}$ as a primary approximation or secondary approximation of the engine speed N.

10. The engine measurement device according to claim 8, wherein said model is a function of said engine parameters.

11. The engine measurement device according to claim 8, wherein said engine measurement device comprises a display unit for displaying said computed engine torque, mechanical loss torque, fuel torque, and any two or more of said engine parameters.

12. The engine measurement device according to claim 8, wherein said torque computation unit computes said engine torque by performing computational processing that includes time differentiation of the time series data of said engine speed.

13. The engine measurement device according to claim 8, wherein:
said torque computation unit comprises a filter processing unit for removing the effects of a moment of inertia that is included in said time series data; and
said filter processing unit performs frequency analysis of said time series data to separate the time series data into a low-frequency component and a high-frequency component, and removes the high-frequency component using a low-pass filter.

14. An engine measurement device for measuring engine performance by bench testing an automobile engine having a load connected to said engine and an external driving means connected to said engine, said engine measurement device comprising:
a first engine control unit for controlling a fuel injection timing of said engine;
a second engine control unit for controlling a throttle travel of said engine;
an external driving means control unit for controlling said external driving means;
a detector for measuring time series data that include at least:
an engine speed of said engine;
an axial torque detected between said engine and a load in a transient state, in a state in which said engine is combustion-driven by the control of said engine control unit; and
an axial torque detected between said engine and the external driving means in a transient state, in a non-combustion drive state in which said external driving means is driven by the control of said engine control unit and the external driving means control unit;
a first torque computation unit for computing a first engine torque on a basis of the time series data of said engine speed and axial torque;
a second torque computation unit for computing an second engine torque as a mechanical loss torque that occurs during said non-combustion driving, on a basis of the time series data of said engine speed and axial torque;
a first model computation unit for modeling said first engine torque using a first model and engine parameters including said engine speed, and said fuel injection timing, wherein a fuel torque generated by the combustion driving of said engine, and a first mechanical loss torque $T_m$ that is a difference between said first engine torque and said fuel torque are calculated from said model;
a second model computation unit for modeling said mechanical loss torque using a second model and engine parameters including said engine speed, an engine oil temperature, and an intake air quantity, wherein a second mechanical loss torque $T_{mm}$ is computed from said second model for each of said engine parameters; and
a comparing unit for comparing the first mechanical loss torque $T_m$ computed by the first model computation unit and the second mechanical loss torque $T_{mm}$ computed by the second model computation unit to verify validity and consistency of the first and second mechanical loss torques.

15. The engine measurement device according to claim 14, wherein a mechanical loss torque due to combustion in said engine is computed by subtracting said second mechanical loss torque $T_{mm}$ from the first mechanical loss torque $T_m$.

16. The engine measurement device according to claim 14, wherein:
the first mechanical loss torque $T_m$ and the second mechanical loss torque $T_{mm}$ are each modeled as primary approximations of the engine speed N; and
the validity and consistency of the first mechanical loss torque $T_m$ and the second mechanical loss torque $T_{mm}$ are verified by comparing the engine speed N coefficients with each other.

17. The engine measurement device according to claim 16, wherein a mechanical loss torque due to combustion in said engine is computed by subtracting said second mechanical loss torque $T_{mm}$ from the first mechanical loss torque $T_m$.

* * * * *